United States Patent
Sano et al.

(10) Patent No.: US 7,333,408 B2
(45) Date of Patent: Feb. 19, 2008

(54) DEMODULATOR, DISK DRIVE DEVICE, AND PHASE ADJUSTMENT METHOD

(75) Inventors: Tatsushi Sano, Kanagawa (JP); Mitsuru Okabe, Tokyo (JP); Tadaaki Nomoto, Tokyo (JP)

(73) Assignee: Sony Corporation, Tokyo (JP)

( * ) Notice: Subject to any disclaimer, the term of this patent is extended or adjusted under 35 U.S.C. 154(b) by 474 days.

(21) Appl. No.: 11/045,352

(22) Filed: Jan. 31, 2005

(65) Prior Publication Data
US 2005/0195511 A1   Sep. 8, 2005

(30) Foreign Application Priority Data
Feb. 5, 2004   (JP)   .............................. 2004-029116

(51) Int. Cl.
*G11B 20/00* (2006.01)
(52) U.S. Cl. .............. 369/47.19; 369/47.16; 369/53.35; 369/47.28
(58) Field of Classification Search ........... 369/47.28, 369/47.16, 53.35, 47.22, 47.19, 53.34
See application file for complete search history.

(56) References Cited

U.S. PATENT DOCUMENTS

| | | | | |
|---|---|---|---|---|
| 7,123,557 B2 * | 10/2006 | Heemskerk et al. | ..... | 369/47.19 |
| 2004/0156291 A1 * | 8/2004 | Heemskerk et al. | ..... | 369/53.34 |
| 2006/0098558 A1 * | 5/2006 | Kobayashi et al. | ...... | 369/275.1 |

* cited by examiner

*Primary Examiner*—William Korzuch
*Assistant Examiner*—Jorge L. Ortiz-Criado
(74) *Attorney, Agent, or Firm*—Oblon, Spivak, McClelland, Maier & Neustadt, P.C.

(57) ABSTRACT

In a demodulation process of a first modulated signal and a second modulated signal, phase adjustment is automatically performed by generating, in response to demodulation results, an optimum phase value of a second internal reference wave for demodulating the second modulated signal. A phase of a second internal reference wave for demodulating the first modulated signal is also adjusted using the optimum phase value for the automatic adjustment.

14 Claims, 25 Drawing Sheets

FIG. 4

| ADIP unit number | ADIP unit type |
|---|---|
| 0 | monotone |
| 1 | sync_0 |
| 2 | monotone |
| 3 | sync_1 |
| 4 | monotone |
| 5 | sync_2 |
| 6 | monotone |
| 7 | sync_3 |
| 8 | reference |
| 9 | data[0] |
| 10 | data[1] |
| 11 | data[2] |
| 12 | data[3] |
| 13 | reference |
| 14 | data[4] |
| 15 | data[5] |
| 16 | data[6] |
| 17 | data[7] |
| 18 | reference |
| ⋮ | ⋮ |
| ⋮ | ⋮ |
| ⋮ | ⋮ |
| 82 | data[59] |

Rows 13–17: REPEATED

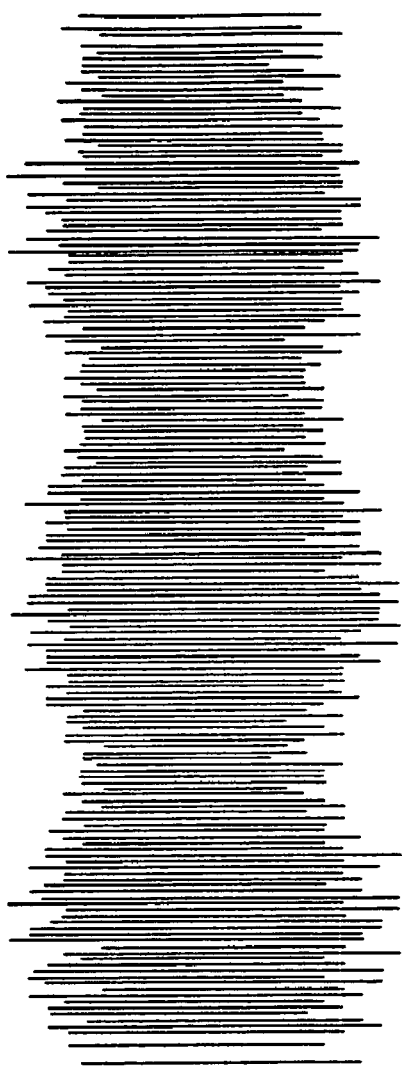
FIG. 17A  MSK DEMODULATED WAVEFORM (VALUE SUMMED SUBSEQUENT TO MULTIPLICATION)
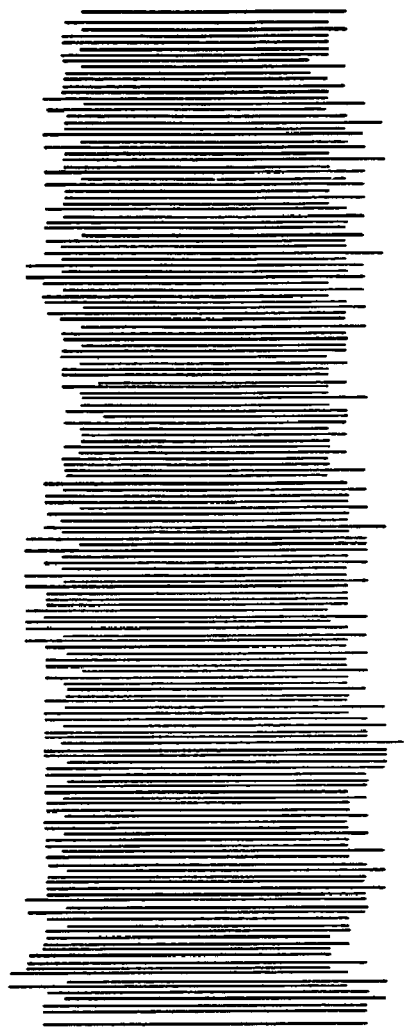
FIG. 17B  IMPROVED MSK DEMODULATED WAVEFORM (VALUE SUMMED SUBSEQUENT TO MULTIPLICATION)

FIG. 21A

| COUNT | 2 | 1 | 0 | -1 | -2 | -3 | -4 | -5 | -6 | -7 | -8 |
|---|---|---|---|---|---|---|---|---|---|---|---|
| STW_phase | 2 | 1 | 0 | 183 | 182 | 181 | 180 | 179 | 178 | 177 | 176 |
| MSK_phase | 186 | 185 | 184 | 183 | 182 | 181 | 180 | 179 | 178 | 177 | 176 |

FIG. 21B

| COUNT | 180 | 181 | 182 | 183 | 184 | 185 | 186 | 187 | 188 | 189 | 190 |
|---|---|---|---|---|---|---|---|---|---|---|---|
| STW_phase | 180 | 181 | 182 | 183 | 184 | 185 | 186 | 187 | 188 | 189 | 190 |
| MSK_phase | 364 | 365 | 366 | 367 | 368 | 369 | 370 | 371 | 372 | 373 | 374 |

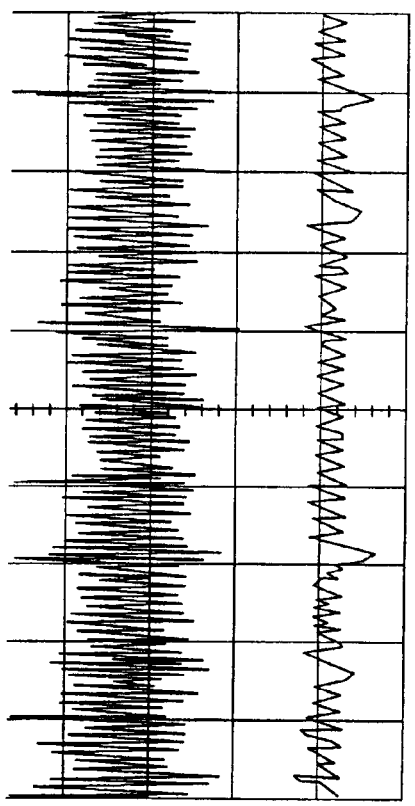
PRIOR ART
FIG. 25A
PRIOR ART
FIG. 25B

DEMODULATOR, DISK DRIVE DEVICE, AND PHASE ADJUSTMENT METHOD

BACKGROUND OF THE INVENTION

1. Field of the Invention

The present invention relates to a demodulator for demodulating a signal containing first and second modulated signals, a disk drive device including the demodulator, and a phase adjustment method of an internal reference wave in the demodulator. More particularly, the present invention relates to a demodulator appropriate for demodulating a minimum shift keying (MSK) modulated signal and a saw-tooth wobble (STW) modulated signal as the first and second modulated signals, a disk drive device, and a phase adjustment method.

2. Description of the Related Art

Demodulation techniques are disclosed in United States Published Patent Application No. 2004/0174800, and Japanese Unexamined Patent Application Publication Nos. 2003-123249, 11-306686, and 2002-74660.

In data recording techniques to record and reproduce digital data, recording media, such as compact disk (CD), a mini-disk (MD), a digital versatile disk (DVD), are used. The optical disk is a generic term referring to recording media made of a thin metal disk protected with plastic. By directing a laser beam onto the disk, a change in a laser beam reflected from the disk is detected to read a signal recorded on the disk.

The optical disks include read-only types, such as CD, CD-ROM (compact disk read-only memory), and DVD-ROM, and read/write types, such as MD, CD-R (compact disk recordable), CD-RW (compact disk–rewritable), DVD-R (DVD recordable), DVD-RW, DVD+RW, and DVD-RAM. In the read/write types, a megneto-optical recording method, a phase change recording method, a color change recording method, and other recording methods are used to record data. The color change recording method, also referred to as write-once method, is considered appropriate for use in data storage because it permits data recording only once. The megneto-optical recording method and the phase change recording method permit data rewriting, thereby finding many applications in the recording of a variety contents including music, video, game, and application programs.

Recently developed high-density optical disks, called Blu-Ray Discs, offer an extremely high data storage capacity.

Guide means for tracking a data track is required to record data onto disks that work in the magneto-optical recording method, the color change recording method, the phase change recording method, or the like. To this end, a groove is formed in a pre-groove process, and the groove or a land (an elevated land portion between grooves in cross section) is tracked in data recording.

Address information needs to be recorded to record data at a predetermined location on a data track. The address information may be sometimes recorded by wobbling the groove.

The track for recording data is formed as a pre-groove, and the sidewall of the pre-groove is wobbled in accordance with the address information.

In this arrangement, addresses can be read from the wobbling information obtained as reflected laser information during recording and reproducing operations. Data is thus recorded to or reproduced from a target location without the need for forming beforehand pit data representing the address on tracks.

The address information arranged as the wobbling groove eliminates the need for arranging address areas discretely on the track and recording an address as pit data. As the address area becomes unnecessary, an amount of actual data recordable is increased accordingly.

Absolute time information (address) represented by the wobbled groove is referred to as the absolute time in pregroove (ATIP), or the address in pregroove (ADIP).

In the case of the Blu-Ray Disk, the groove is wobbled in accordance with a modulated waveform that is modulated in a combination of an MSK modulation and an STW modulation.

The ADIP information, formed using the MSK modulation, the STW modulation, or a combination of both modulations, will be discussed in more detail later. The MSK modulation is one of continuous phase frequency shift keying (FSK) modulations with a modulation index of 0.5.

In the STW modulation, a second harmonic of a wobble fundamental wave is added to or subtracted from the wobble fundamental wave so that a modulated wave, such as a saw-tooth wave, is generated.

The disk drive device of the Blu-Ray Disk, for example, contains an MSK demodulator and STW demodulator to reproduce the ADIP information.

Techniques for demodulating MSK/STW modulated signals, and decoding the ADIP information are disclosed in United State Published Patent Application No. 2004/0174800, and Japanese Unexamined Patent Application Publication Nos. 11-306686, and 2002-74660.

FIG. 24 illustrates a circuit performing the MSK modulation and the STW modulation as a pre-process prior to the decoding of the ADIP information. The circuit performs the MSK modulation and the STW modulation on reflected laser information from the wobbling groove on the disk as the push-pull (P/P) signal (wobble signal). The demodulated signal is then supplied to a subsequent stage ADIP decoder.

The push-pull signal P/P supplied as the wobble signal is fed to an analog-to-digital (A/D) converter 111 and a comparator 112 in an MSK demodulator 110 of FIG. 24.

The comparator 112 binarizes the push-pull signal P/P and supplies a PLL (phase-lock loop) circuit 113 with the binarized push-pull signal P/P. In response to the binarized signal, the PLL circuit 113 generates a clock (hereinafter referred to as a wobble clock WCK) having a wobble frequency of the push-pull signal P/P, namely, of a modulated signal of the wobbling groove.

The wobble clock WCK outputted from the PLL circuit 113 is supplied to a PLL circuit 114 and a delay circuit 116.

The PLL circuit 114 frequency-doubles the wobble clock WCK, thereby generating a master clock MCK. The master clock MCK serves as a sampling clock of the A/D converter 111. The master clock MCK is also used in each of the delay circuit 116 and a counter 117.

The delay circuit 116 gives a predetermined delay to the wobble clock WCK every master clock MCK, and the resulting wobble clock WCK to the counter 117. The delay time is set by a central-processing unit (CPU) 100.

The counter 117 counts the master clock MCK. The counter 117 resets the count thereof at a reset timing in response to the rising edge of the wobble clock WCK applied from the delay circuit 116. More specifically, the counter 117 starts counting the master clock MCK at the reset timing in response to the wobble clock WCK, and outputs the count to a cos (cosine) table 121.

The cos table 121 is a table storing waveform data for an internal reference wave. The data is read in response to the count of the counter 117.

The master clock MCK has a frequency of 23 clocks in one period of the wobble fundamental waveform (wobble clock WCK unit). The counter 117, reset every period of the wobble fundamental waveform, generates counts from 0 through 22.

The cos table 121 stores data TD0-TD22 as a cosine waveform data serving as the internal reference wave. The data TD0-TD22 is successively read in response to the count. In this way, the internal reference wave having the same frequency as the wobble fundamental waveform is generated and then supplied to a multiplier 118.

The A/D converter 111 samples the input push-pull signal P/P in response to the master clock MCK, thereby converting the push-pull signal P/P into digital data (wobble data), and supplying the digital data to the multiplier 118.

The multiplier 118 multiplies the wobble data by the internal reference wave data. The product is then supplied to an accumulator 119. The accumulator 119 is reset in response to the rising timing of the wobble clock WCK from the delay circuit 116. The accumulator 119 is thus reset at the same timing as the reset timing of the counter 117. The accumulator 119 accumulates the products in the wobble fundamental waveform period. For example, the accumulator 119 repeats the accumulation of 23 product samples.

The accumulated value (value summed subsequent to the multiplication) is positive within the wobble fundamental waveform duration in response to the input wobble signal, while being negative within the MSK modulated duration. The positive/negative determiner 120 determines the accumulated value for positive or negative value, thereby resulting in a demodulated signal that identifies an MSK mark and a fundamental wave.

An STW demodulator 130, although not detailed here, is identical in structure to the MSK demodulator 110. The STW demodulator 130 converts the push-pull signal P/P as a modulated signal into digital data, multiplies the digital data by the internal reference wave, and performs a positive/negative determination process on the sum of the products. An STW demodulated signal thus results. In the case of the STW demodulator 130, the internal reference wave is a second harmonic wave of the wobble fundamental waveform. The accumulation of the products is performed in a plurality of wobble durations in which the wobble is STW modulated, rather than in one wobble fundamental waveform.

The wobble signal fluctuates due to crosstalks between adjacent tracks on the disk, an output amplitude difference of the wobble signal between prior to recording and subsequent to recording, and tolerances in the quality of the disk. The use of an automatic gain control (AGC) circuit and the limiting of the amplitude of the wobble signal are contemplated to control variations in the amplitude of the wobble signal, as disclosed in Japanese Unexamined Patent Application Publication Nos. 11-306686 and 2002-74660. The wobble signal is subject to disturbance not only in amplitude but also in time axis (phase).

As will be discussed later, to control phase variations, a reference signal is used to adjust a phase of the internal reference wave for the detection of the demodulator in the STW modulated signal of the wobble signal in an ADIP format of the Blu-Ray Disk. When the amplitude variations are large due to external disturbance, demodulation becomes difficult.

No function to detect a phase variation due to external disturbance is originally available in the demodulation of the MSK modulated signal. The demodulation of the MSK modulated signal is difficult when the variations in phase due to external disturbance become large.

As shown in FIG. 24, the wobble signal (push-pull signal P/P) is accumulated within a predetermined duration of time after being multiplied by the internal reference wave. After the accumulated value is subjected to the positive/negative determination process, an MSK demodulated signal and an STW demodulated signal are obtained.

FIG. 25A illustrates a wobble signal and an MSK demodulated signal as the accumulated output of the accumulator 119. FIG. 25B illustrates the waveform of FIG. 25A in a time scale contracted form.

As phase variations due to external disturbance become large, the MSK demodulated signal waveform (accumulated value) periodically varies in amplitude. MSK demodulation becomes difficult where the amplitude of the signal becomes small. The MSK demodulation becomes difficult particularly when a disk large in a beat noise level is replayed, or when a disk having a focus offset or a large media inclination is replayed.

SUMMARY OF THE INVENTION

Accordingly, it is an object of the present invention to provide a demodulator that performs a stable demodulation process under the presence of phase variations due to external disturbance.

According to a first aspect of the present invention, a demodulator for demodulating an input signal containing a first modulated signal and a second modulated signal, includes a first internal reference wave generator for outputting a first internal reference wave corresponding to the first modulated signal, a first demodulation calculator for generating a demodulated signal of the first modulated signal through a calculation process on the first internal reference wave and the input signal, a first phase adjuster for adjusting a phase of the first internal reference wave outputted from the first internal reference wave generator, a second internal reference wave generator for outputting a second internal reference wave corresponding to the second modulated signal, a second demodulation calculator for generating a demodulated signal of the second modulated signal through a calculation process on the second internal reference wave and the input signal, and a second phase adjuster for determining an optimum phase of the second internal reference wave based on the demodulation results of the second demodulation calculator and adjusting a phase of the second internal reference wave outputted from the second internal reference wave generator, based on the value of the determined optimum phase. The first phase adjuster adjusts the phase of the first internal reference wave outputted from the first internal reference generator, using the optimum phase value of the second phase adjuster.

According to a second aspect of the present invention, a disk drive device includes a reader for reading a wobble signal containing a first modulated signal and a second modulated signal, recorded as a wobbling groove on a disk recording medium. The demodulator thus demodulates the wobble signal read by the reader. A decoder decodes the demodulated signal, thereby outputting information, recorded as the wobbling groove on the disk.

The decoder acquires address information on the disk recording medium as information recorded as the wobbling groove.

Preferably, the first modulated signal includes a minimum shift keying modulated signal, and the first internal reference wave generator outputs the first internal reference wave having the same frequency as a reference wave of the minimum shift keying modulated signal.

Preferably, the second modulated signal includes a saw-tooth wobble modulated signal, and the second internal reference wave generator outputs, as the second internal reference wave, a second harmonic of a reference wave of the saw-tooth wobble modulated signal.

The first phase adjuster may add, to a set phase adjustment value, a phase adjustment value based on the optimum phase value of the second phase adjuster, and may adjust the phase of the first internal reference wave with the sum of the phase adjustment values.

The second phase adjuster may includes a counter counting up or down the count thereof in response to the demodulation results from the second demodulation calculator, and acquires, as the optimum phase value, the count of the counter, and the counter may be controlled so that the optimum phase value is a consecutive value.

Preferably, the counter is loaded with a predetermined initial count at the beginning of phase adjustment.

The present invention in a third aspect relates to a method of adjusting a first internal reference wave and a second internal reference wave in a demodulator that includes a first internal reference wave generator for outputting the first internal reference wave corresponding to a first modulated signal in an input signal containing the first modulated signal and a second modulated signal, a first demodulation calculator for generating a demodulated signal of the first modulated signal through a calculation process on the first internal reference wave and the input signal, a second internal reference wave generator for outputting the second internal reference wave corresponding to the second modulated signal in the input signal, and a second demodulation calculator for generating a demodulated signal of the second modulated signal through a calculation process on the second internal reference wave and the input signal. The adjusting method includes steps of determining an optimum phase of the second internal reference wave based on the demodulation result of the second demodulation calculator, adjusting a phase of the second internal reference wave outputted from the second internal reference generator based on the value of the determined optimum phase, and adjusting a phase of the first internal reference wave outputted from the first internal reference wave generator, based on the optimum phase value.

In a demodulation process of the first modulated signal and the second modulated signal, phase adjustment is automatically performed by generating, in response to demodulation results, an optimum phase value of a detection reference wave, i.e., the second internal reference wave for demodulating the second modulated signal. A phase of a detection reference wave, i.e., the first internal reference wave for demodulating the first modulated signal is also adjusted using the optimum phase value for the automatic adjustment. Modulation is reliably performed even if phase variations take place in the input signal (wobble signal) due to crosstalks in adjacent tracks, a decrease in amplitude of the modulated signal due to a drop in reflectivity subsequent to recording, disk skew, etc. Addressing error is reduced and read and write performance is improved because demodulation performance of the MSK modulated signal and the STW modulated signal is improved in the disk drive device. Reliable read and write operations are performed on a read and write media having variations in physical characteristics and read and write characteristics.

Since automatic phase adjustment improves demodulation performance in the MSK modulation and the STW modulation, wobble address demodulation performance is also maintained against variations in characteristics of a pickup. As a result, the production yield of the pickups is heightened.

The first phase adjuster for the MSK modulation adds, to the set phase adjustment value, the phase adjustment value based on the optimum phase value from the second phase adjuster for the STW modulation, and adjusts the phase of the first internal reference wave with the sum of the phase adjustment values. In this way, optimum phase adjustment is performed.

The second phase adjuster includes the counter counting up or down the count thereof in response to the demodulation results from the second demodulation calculator, and acquires, as the optimum phase value, the count of the counter, and the counter is controlled so that the optimum phase value is the consecutive value. The optimum phase value as a consecutive value is transferred to the first phase adjuster. Optimum phase adjustment control is thus performed.

The counter is loaded with the predetermined initial count at the beginning of phase adjustment. From the beginning of phase adjustment, consecutive counts are outputted.

BRIEF DESCRIPTION OF THE DRAWINGS

FIG. 4 illustrates ADIP information formed of the ADIP unit;

FIGS. 17A and 17B illustrate operation of an up-down counter in accordance with one embodiment of the present invention;

FIGS. 21A and 21B illustrate the process of the other up-down counter in accordance with one embodiment of the present invention;

FIGS. 25A and 25B illustrate an MSK demodulated signal affected by phase variations.

DESCRIPTION OF THE PREFERRED EMBODIMENTS

Figure 1A:
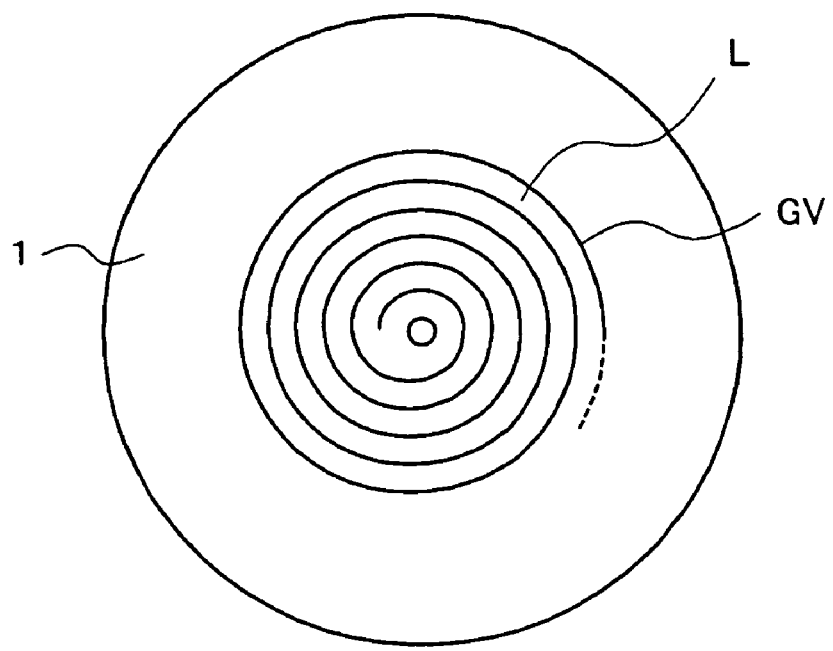
FIGS. 1A and 1B illustrate a wobbling groove of a disk.
Figure 1B:
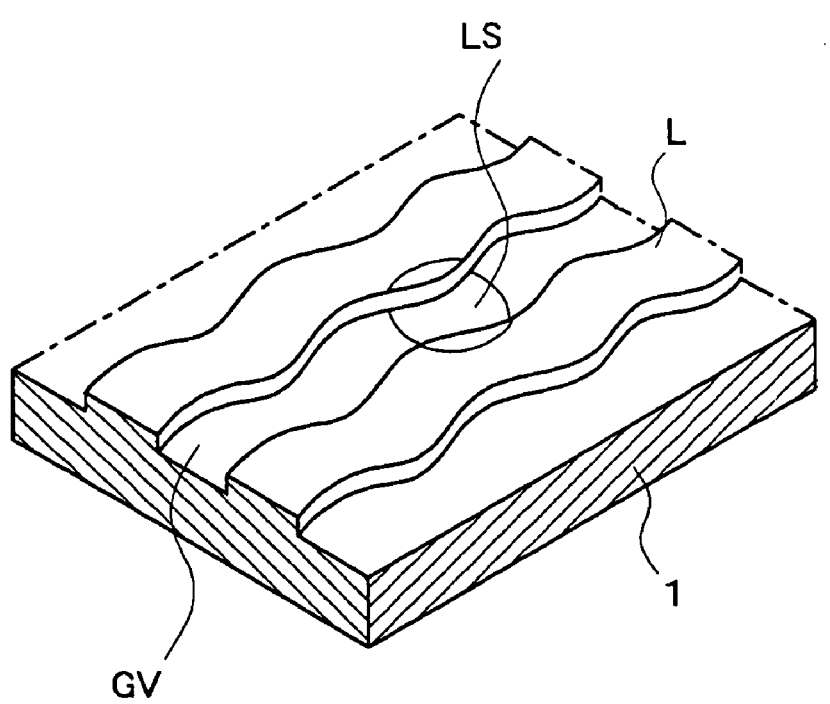

An optical disk 1 of one embodiment of the present invention contains a groove GV serving as a recording track as shown in FIG. 1A. The groove GV spirals from an inner circle to an outer circle. FIG. 1B is a sectional view illustrating an elevated land L and a groove GV alternately formed in a radial direction of the optical disk 1. The direction of the spiral of the optical disk 1 shown in FIG. 1A is viewed from the label of the optical disk 1. If the optical disk 1 has a plurality of recording layers, the spiral configuration can be different from layer to layer.

The groove GV of the optical disk 1 wobbles in a tangential direction of the spiral circle as shown in FIG. 1B. The wobbling configuration of the groove GV corresponds to the wobble signal. An optical disk drive detects positions of both edges of the groove GV in a laser beam reflected from a laser spot LS directed on the groove GV. When the laser spot LS is moved along a recording track, the optical disk drive detects a variation component in the edge positions along the disk radial direction to reproduce the wobble signal.

The wobble signal contains modulated address information of a recording track in a recording position (physical address and other additional information). By demodulating the address information from the wobble signal, address control is performed in the recording and reproduction of data.

The embodiments of the present invention are described in connection with the optical disk having record grooves. The present invention is applicable to not only the record groove disk, but also to an optical disk of a land record type in which data is recorded on a land. The present invention is also applicable to a land-groove record optical disk.

The optical disk 1 of the present embodiment modulates the address information in the wobble signal using two modulation methods. One method is an MSK (minimum shift keying) modulation method, and the other is an STW (saw-tooth wobble) modulation method. In the STW modulation, even order harmonic waves are added to a sinusoidal carrier signal, and data is modulated by changing the polarity of each harmonic signal in response to the code of the data.

Figure 3A:
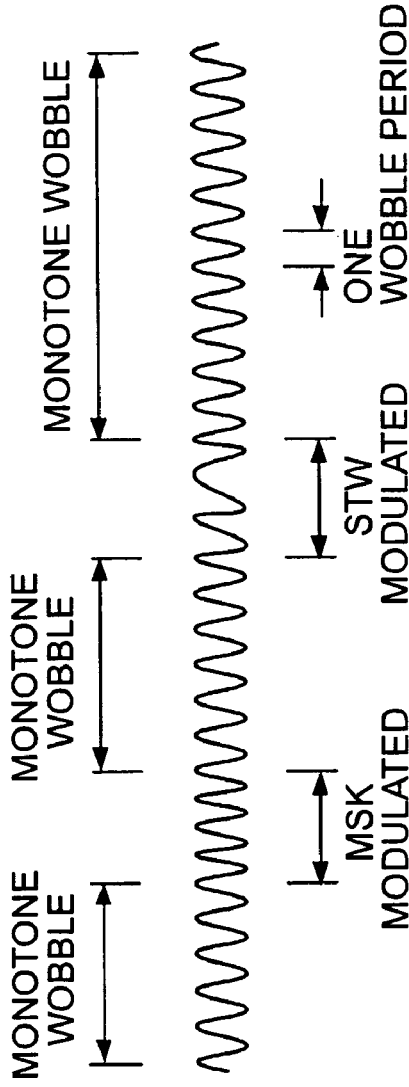
FIGS. 3A and 3B illustrate an ADIP unit.

As shown in FIG. 3A, the optical disk 1 has a block where a reference carrier signal wave having a predetermined frequency continues throughout a predetermined period. The wobble signal is generated in the block. The wobble signal contains an MSK modulation area where MSK modulated address information is placed, and an STW modulation area where STW modulated address information is placed. The MSK modulated address information and the STW modulated address information are inserted into different locations in the block. One of two sinusoidal carrier signals used in the MSK modulation and a carrier signal of the STW modulation are referred to as reference carrier signals. The MSK modulation area and the STW modulation area are arranged in different locations within the block, and a reference carrier signal having at least one period is arranged between the MSK modulation area and the STW modulation area.

An area having no modulated data with a frequency component of the reference carrier signal appearing thereon is referred to a monotone wobble. A sinusoidal signal used as the reference carrier signal is represented by cos (ωt). One period of the reference carrier signal is referred to as one wobble period. The frequency of the reference carrier signal remains unchanged from an inner circle to an outer circle on the optical disk 1, and is determined relative to a linear velocity at which the laser spot LS moves along a recording track.

The MSK modulation and the STW modulation are described in more detail. The modulation method of the address information using the MSK modulation is described first.

The MSK modulation is one of phase continued FSK (frequency shift keying) modulations having a modulation index of 0.5. In the FSK modulation, data is modulated with two carrier signals having a frequency f1 and a frequency f2 set to correspond to the codes of the data to be modulated, namely, "0" and "1". If the data is "0", a sinusoidal wave having the frequency f1 is outputted, while if the data is "1", a sinusoidal wave having the frequency f2 is outputted. In the case of the phase continued FSK modulation, the phases of the two carrier signals continue at a switching timing of the codes of the modulated data.

In the FSK modulation, a modulation index "m" is defined as follows:

$$m = |f1 - f2|T$$

where T represents a data transmission rate (1/shortest code length time). When the modulation index "m" is 0.5, the phase continued FSK modulation is referred to as the MSK modulation.

Figure 2A:
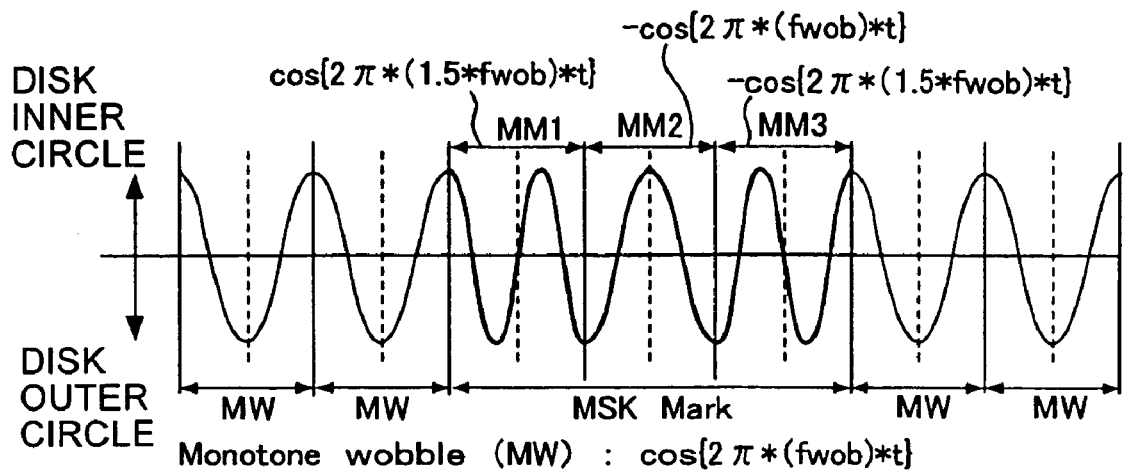
FIGS. 2A and 2B illustrate an MSK modulated wave and an STW modulated wave in a wobble signal.

FIG. 2A illustrates the MSK modulation. As shown in FIG. 2A, an MSK modulated waveform (MM1, MM2, and MM3) in three wobble period is interposed between monotone wobbles MW.

If the monotone wobble is cos (ωt), one of the two frequencies used in the MSK modulation has the same frequency as the reference carrier signal, and the other of the two frequencies has a frequency 1.5 times the reference carrier signal. The one of the signal waveforms used in the MSK modulation is cos (ωt) or −cos (ωt), while the other is cos (1.5ωt) or −cos (1.5ωt).

FIG. 2A shows two monotone wobbles, the MSK modulation area, and two monotone wobbles. In that case, the signal waveform of an MSK stream is cos(ωt), cos(ωt), cos(1.5ωt), cos(ωt), cos(1.5ωt), cos(ωt) every one wobble period. As shown, $\cos(\omega t) = \cos\{2\pi(\text{fwob})t\}$ where fwob is the reference carrier frequency. The three wobble periods as the MSK modulation area is MM1=$\cos\{2\pi(1.5\text{fwob})t\}$, MM2=$-\cos\{2\pi(\text{fwob})t\}$, and MM3=$-\cos\{2\pi(1.5\text{fwob})t\}$.

The first wobble period (MM1) has the frequency 1.5 times the monotone wobble, the second wobble period (MM2) has the same frequency as the monotone wobble, and the third wobble period has the frequency 1.5 times the monotone wobble. Within three wobble periods, phase reverts to the first phase. More specifically, the preceding wobble and the subsequent wobble are continuous in phase, and the second wobble (MM2) has a polarity inverted from the monotone wobble.

By setting wobble signal to be the MSK stream as described above in the optical disk 1, the address information is modulated in the wobble signal. The MSK modulated signal can be synchronous detected as described below.

When data modulated in the MSK modulation is inserted into the wobble signal in the optical disk 1, a data stream of data to be modulated is differential coded by a clock unit corresponding to the wobble period. More specifically, the stream of the data to be modulated and data delayed by one period of the reference carrier signal are subjected to a differential process. The differential coded data is set to be precode data. The precode data is MSK modulated and the above-referenced MSK stream results.

The differential coded data (precode data) has a 1 bit when the code of the data changes. Since the code length of the data is at least twice the wobble period, the reference carrier signal ($\cos(\omega t)$) or the inverted version ($-\cos(\omega t)$) thereof is inserted into a latter half of the code length of the data. If the bit of the precode data becomes "1", the waveform having the frequency 1.5 times the reference carrier signal is inserted, and the waveform is concatenated with the phase matched at a code switching point. The signal waveform inserted into the latter half of the code length of the data is the reference carrier signal ($\cos(\omega t)$) if the data is "0", and is the inverted version ($-\cos(\omega t)$) thereof if the data is "1". The synchronous detection output becomes a positive value if the phase matches the carrier signal, and becomes a negative value if the phase is inverted. If the MSK modulated signal is synchronous detected with the reference carrier signal, demodulation of the modulated data is possible.

The STW modulation is described below.

In the STW modulation, the even order harmonic signals are added to the sinusoidal carrier signal. The polarity of the harmonic signal is changed in response to the code of the data. A digital signal is thus modulated.

The carrier signal of the STW modulation is a signal identical in frequency and phase to the reference carrier signal ($\cos(\omega t)$) as the carrier signal of the MSK modulation. The even order harmonic signals added are the second harmonic wave $\sin(2\omega t)$ and $-\sin(2\omega t)$ of the reference carrier signal $\cos(\omega t)$, and have an amplitude of $-12$ dB referenced to the amplitude of the reference carrier signal. The minimum code length of the data is twice the wobble period (the period of the reference carrier signal).

If the code of the data is "1", $\sin(2\omega t)$ is added to the carrier signal, and if the code of the data is "0", $-\sin(2\omega t)$ is added to the carrier signal in modulation.

Figure 2B:
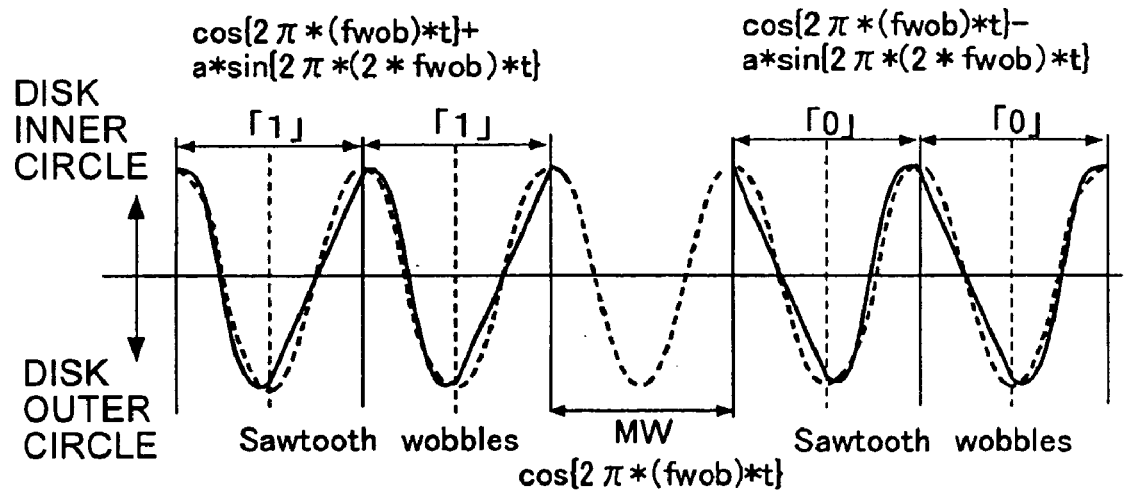

FIG. 2B illustrates a signal waveform of the modulated wobble signal. As shown in FIG. 2B, the signal waveform of the monotone wobble MW of the reference carrier signal ($\cos(\omega t)$) is placed in the central wobble duration. The signal waveform in the preceding two wobble periods has $\sin(2\omega t)$ added to the reference carrier signal ($\cos(\omega t)$), namely, the signal waveform with the data being "1". The two wobble periods subsequent to the monotone wobble MW has a signal waveform having $-\sin(2\omega t)$ added to the reference carrier signal ($\cos(\omega t)$), namely, the signal waveform with the data being "0".

As shown, the monotone wobble $\cos(\omega t)=\cos\{2\pi(\text{fwob})t\}$, and the STW modulated signal is $\cos\{2\pi(\text{fwob})t\}+a\cdot\sin\{2\pi(2\text{fwob})t\}$ if the data is "1". The STW modulated signal is $\cos\{2\pi(\text{fwob})t\}-a\cdot\sin\{2\pi(2\text{fwob})t\}$.

As shown in FIG. 2B, the STW signal in one waveform rises sharply toward a disk outer circle and then mildly returns toward a disk outer circle, and in the other waveform rises mildly toward a disk outer circle and then sharply returns toward a disk inner circle, in order to represent "1" and "0". The two waveforms share the common zero-crossing points with the monotone wobble MW represented by broken waveform. When a clock is extracted from a fundamental wave common to the MSK monotone wobble MW, the phase of the clock is correct.

When the positive and negative even order harmonic signals are added to the reference carrier signal, the modulated data is demodulated based on characteristics of the generated waveform, by synchronously detecting the modulated signal with the harmonic signals and by integrating the synchronous detection output with the code length of the modulated data.

The second harmonic waves are added to the carrier signal in the optical disk 1. The harmonic wave to be added is not limited to the second harmonic wave. Any even order harmonic can be added. Although only the second order harmonic wave is added in the optical disk 1, a plurality of order harmonic waves can be concurrently added, for example, both the second order harmonic wave and the fourth order harmonic wave can be concurrently added.

The ADIP structure containing the MSK modulation and the STW modulation is described below. One unit as ADIP information (ADIP unit) is composed of 56 wobbles.

Figure 3B:
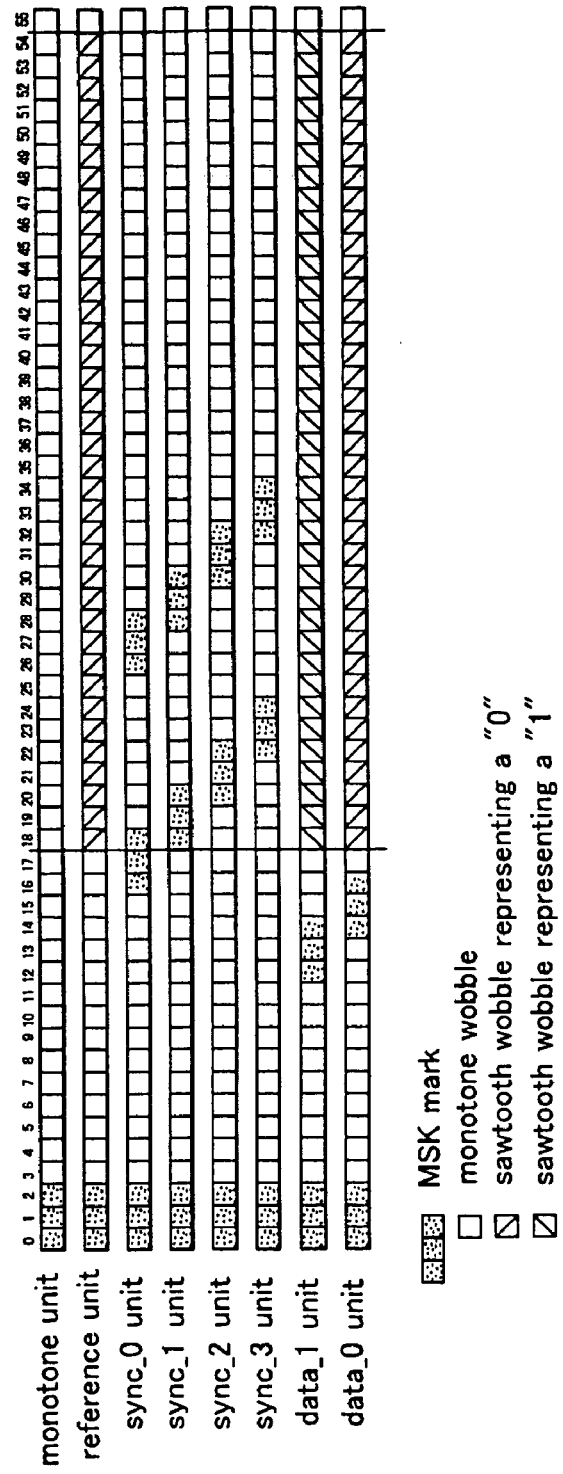

FIG. 3B shows ADIP units of eight types. The ADIP units of eight types are a monotone unit, a reference unit, a sync 0 unit, a sync 1 unit, a sync 2 unit, a sync 3 unit, a data 1 unit, and a data 0 unit.

In the ADIP units of the eight types, wobble numbers 0, 1, and 2 in the head thereof represent an MSK mark.

In the monotone unit, wobble numbers 4-55 in succession to the MSK mark are all monotone wobbles.

In the reference unit, wobble numbers 18-54 are STW modulated wobbles representing 0 value.

The sync 0 unit, the sync 1 unit, the sync 2 unit, and the sync 3 unit are ADIP units for sync information. As shown in FIGS. 3A and 3B, an MSK mark is positioned at a predetermined wobble number position.

The data 1 unit represents a value "1", and the data 0 unit represents a value "0". In the data 1 unit, the MSK mark is arranged at wobble numbers 12-14, and wobble numbers 18-54 are STW modulated wobbles having a value "1". In the data 0 unit, the MSK mark is arranged in wobble numbers 14-16, and wobble numbers 18-54 are STW modulated wobbles having a value "0".

A single piece of ADIP information (address information) is thus composed of 83 ADIP units.

As shown in FIG. 4, one unit of ADIP information is composed of ADIP units 0-82. The ADIP unit numbers 0-7 are a monotone unit, a sync 0 unit, a monotone unit, a sync 1 unit, a monotone unit, a sync 2 unit, a monotone unit, and a sync 3 unit.

In the ADIP unit number 8 and subsequent ADIP unit numbers, five units including a reference unit and data units of 4 bits is repeated. Each of the data units (for example, data[0], data[1], data[2], data[3], ... data[59]) is either data 1 unit or data 0 unit. The ADIP information of 60 bits is thus arranged. The 60 bits includes an address value, additional information, and an ECC (error correcting code) parity.

Figure 5:
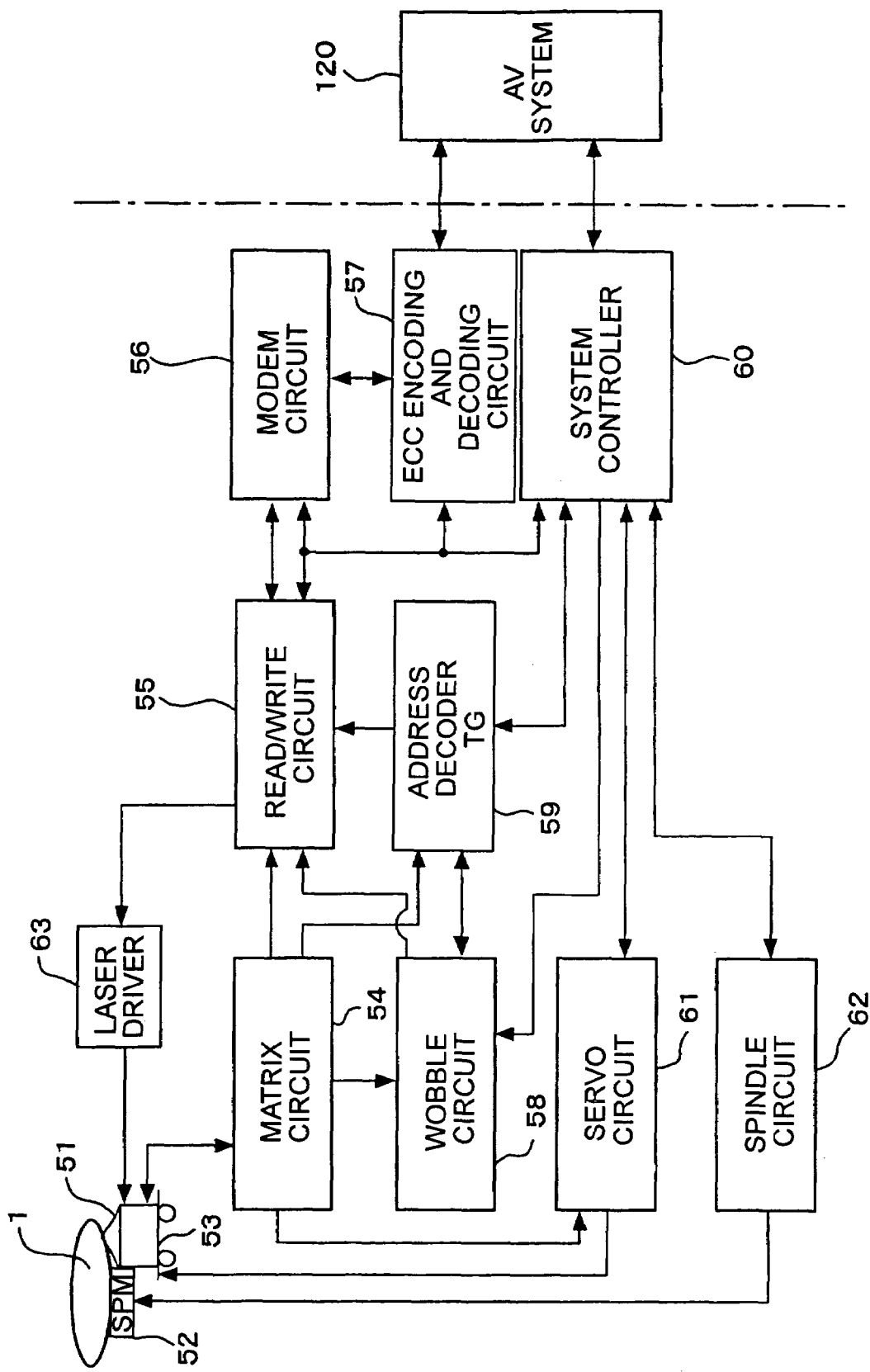
FIG. 5 is a block diagram of a disk drive device in accordance with one embodiment of the present invention.

A disk drive device recording data to and reproducing data from the optical disk 1 is described below. FIG. 5 illustrates the disk drive device.

The optical disk 1 is placed on a turntable (not shown), and is driven at a constant linear velocity (CLV) by a spindle motor 52.

An optical pickup (optical head) 51 reads the ADIP information embedded as a wobble in a groove track on the optical disk 1.

Read-only management information, such as disk physical information, is recorded in an emboss pit or a wobbling groove on the optical disk 1. Such information is read by the optical pickup 51.

The optical pickup 51 records user data in a phase change mark during data recording, and reads a recorded mark during reproduction.

The optical pickup 51 contains a laser diode serving as a laser light source, a photodetector detecting reflected light, an objective lens serving as an output end of a laser light beam, and an optical system (not shown) directing the laser beam to a disk recording surface through the objective lens, and guiding the reflected laser beam toward the photodetector. The laser diode outputs a blue laser having a wavelength of 405 nm. The NA (numerical aperture) of the optical system is 0.85.

The objective lens is movably supported by a dual-axis mechanism in a tracking direction and a focus direction in the optical pickup 51.

The entire optical pickup 51 is movably supported by a sled mechanism 53 in a radial direction on the optical disk 1.

The laser diode in the optical pickup 51, driven by a drive signal (drive current) by a laser driver 63, emits a laser light beam.

Information in a laser light beam reflected from the optical disk 1 is detected by the photodetector. The photodetector converts the laser light information into an electrical signal responsive to an amount of received light, and supplies the resulting electrical signal to a matrix circuit 54. The matrix circuit 54 includes a current-voltage converter circuit responding to an output current from a plurality of photosensitive elements as the photodetector, and a matrix calculating and amplifying circuit. The matrix circuit 54 generates required signals in a matrix calculation process.

For example, a high-frequency signal (reproduced data signal), a focus error signal for servo control, and a tracking error signal are generated.

Furthermore, a signal relating to the wobbling of the groove, namely, a push-pull signal as a signal detecting the wobble is also generated.

The reproduced data signal outputted from the matrix circuit 54 is supplied to a read/write circuit 55, the focus error signal and the tracking error signal are supplied to a servo circuit 61, and the push-pull signal is supplied to a wobble circuit 58.

The read/write circuit 55 binarizes the reproduced data signal, and generates a reproduced clock through a phase-lock loop (PLL) process, thereby reproducing the data read as a phase change mark. The reproduced data is then supplied to a modem circuit 56.

The modem circuit 56 functions as a decoder for reproducing, and an encoder for recording.

During reproduction, the modem circuit 56 decode run-length limited code in accordance with the reproduced clock.

An ECC (error correcting code) encoding and decoding circuit 57 performs an ECC encoding process for attaching an error correcting code during recording and an ECC decoding process for error correction during reproduction.

During reproduction, the ECC encoding and decoding circuit 57 captures the data demodulated by the modem circuit 56 into a memory thereof, and performs an error detection and correcting process, and a deinterleave process on the data, thereby resulting in the reproduced data.

The reproduced data decoded by the ECC encoding and decoding circuit 57 is read in response to an instruction from the system controller 60 and transferred to an AV (audio-visual) system 120.

A push-pull signal outputted from the matrix circuit 54 as the signal relating to the wobbling of the groove is processed by a wobble circuit 58. The wobble circuit 58 MSK demodulates and STW demodulates the push-pull signal as the ADIP information into a data stream forming an ADIP address, and outputs the data stream to an address decoder 59.

The address decoder 59 decodes the supplied data, thereby resulting in the address value. The address value is supplied to the system controller 60.

The address decoder 59 generates a clock in the PLL process that uses the wobble signal supplied from the wobble circuit 58. The generated clock is supplied to related elements as an encode clock.

The MSK demodulation and the STW demodulation performed by the wobble circuit 58 will be described later.

During recording, record data is transmitted from the AV system 120. The record data is transferred to a memory in the ECC encoding and decoding circuit 57 for buffering.

The ECC encoding and decoding circuit 57 performs an encode process on the buffered data, thereby attaching an error correcting code, performing an interleave operation, and attaching a subcode.

The ECC encoded data is modulated by the modem circuit 56 in RLL (run length limited) (1-7) PP (parity preserve/prohibit rmtr(repeated minimum transition run length)) method. The modulated signal is supplied to the read/write circuit 55.

During recording, the encode clock serving as a reference clock in the encode process is the clock generated from the wobble signal as previously discussed.

The read/write circuit 55 performs a record correction process on the record data generated in the encode process. More specifically, the read/write circuit 55 makes adjustments taking into consideration characteristics of a recording layer, and a spot configuration of the laser light beam, makes a fine adjustment of an optimum recording power in response to a recording linear velocity, and makes adjustments on a laser drive pulse waveform. The resulting laser drive pulse is then transferred to a laser driver 63.

The laser driver 63 supplies the laser drive pulse to the laser diode in the optical pickup 51 for laser light emission. A pit (phase change mark) is thus formed in response to the record data on the optical disk 1.

The laser driver 63, including an auto power control (APC) circuit, monitors, as a laser output power, an output from a laser power monitoring detector arranged in the optical pickup 51 to control the laser output power to a constant value regardless of temperature change. The system controller 60 provides a target value of the laser output during recording and reproduction. During recording and reproduction, the laser driver 63 controls the laser output level to the target value.

The servo circuit 61 generates servo drive signals for focusing, tracking, and sledding in response to the focus error signal and the tracking error signal from the matrix circuit 54, thereby performing servo control.

More specifically, the servo circuit 61 generates a focus drive signal and a tracking drive signal in response to the focus error signal and the tracking error signal, respectively, to control a focus coil and a tracking coil in the dual-axis mechanism in the optical pickup 51. In this arrangement, a tracking servo loop and a focus servo loop are constructed of the optical pickup 51, the matrix circuit 54, the servo circuit 61, and the dual-axis mechanism.

In response to a track jump instruction from the system controller 60, the servo circuit 61 turns off the tracking servo loop and outputs a jump drive signal, thereby executing a track jump operation.

The servo circuit 61 generates a sled error signal obtained as a low-frequency component of the tracking error signal, and a sled drive signal in response to access execution control from the system controller 60, thereby driving a sled mechanism 53. The sled mechanism 53, including a main shaft holding the optical pickup 51, a sled motor, and a mechanism containing a transfer gear (all these elements not shown), drives a sled motor in response to the sled drive signal. The optical pickup 51 is thus slid to a target location.

The spindle circuit 62 drives the spindle motor 52 at the CLV.

The spindle circuit 62 acquires the clock generated through the PLL process to the wobble signal as current rotational speed information of the spindle motor 52, and compares the current rotational speed information with a predetermined CLV reference speed, thereby resulting in a spindle error signal.

During data reproduction, the reproduction clock generated by the PLL in the read/write circuit 55 (a clock serving as a reference in the decode process) becomes the current rotational speed information of the spindle motor 52. By comparing this current rotational speed information with the predetermined CLV reference speed information, a spindle error signal can also be generated.

The spindle circuit 62 outputs a spindle drive signal generated in response to the spindle error signal, thereby CLV rotating the spindle motor 52.

The spindle circuit 62 generates the spindle drive signal in response to a spindle kick/brake control signal from the system controller 60, thereby starting, stopping, accelerating, and decelerating the spindle motor 52.

A variety of operations of the above-referenced servo system and the recording and reproduction system are controlled by the system controller 60.

The system controller 60 executes the variety of processes in response to commands from the AV system 120.

Upon receiving a write command from the AV system 120, the system controller 60 moves the optical pickup 51 to an address of a write target. The ECC encoding and decoding circuit 57 and the modem circuit 56 perform an encode process on the data transferred from the AV system 120 (including audio data and video data in MPEG (moving picture experts group) 2). The laser drive pulse from the read/write circuit 55 is supplied to the laser driver 63 to record the data.

When a read command requesting the transfer of data recorded on the optical disk 1 (such as MPEG2 video data) is supplied from the AV system 120, a seek operation targeting an instructed address is performed. More specifically, a command is issued to the servo circuit 61 to cause the optical pickup 51 to access a targeted address designated by a seek command.

Operational control is performed to transfer data within a designated session to the AV system 120. More specifically, the data is read from the optical disk 1, and the read/write circuit 55, the modem circuit 56, and the ECC encoding and decoding circuit 57 are caused to perform the decode/buffering operations. The requested data is thus transferred to the AV system 120.

During the data recording and reproduction with the phase change mark, the system controller 60 performs access control and recording and reproduction control using the ADIP address detected by the wobble circuit 58 and the address decoder 59.

FIG. 5 illustrates the disk drive device connected to the AV system 120. The disk drive device can be connected to a personal computer.

The disk drive device may not be connected to another apparatus. In such a case, an operational panel and a display may be arranged on the disk drive device, and the structure of the data input and output interfaces may be different from those of FIG. 5. The recording and reproduction process is performed in response to a user operation, and terminals for inputting and outputting a variety of data are arranged.

Other arrangements are also contemplated. A record only device, or a reproduction only device can be contemplated.

Figure 6:
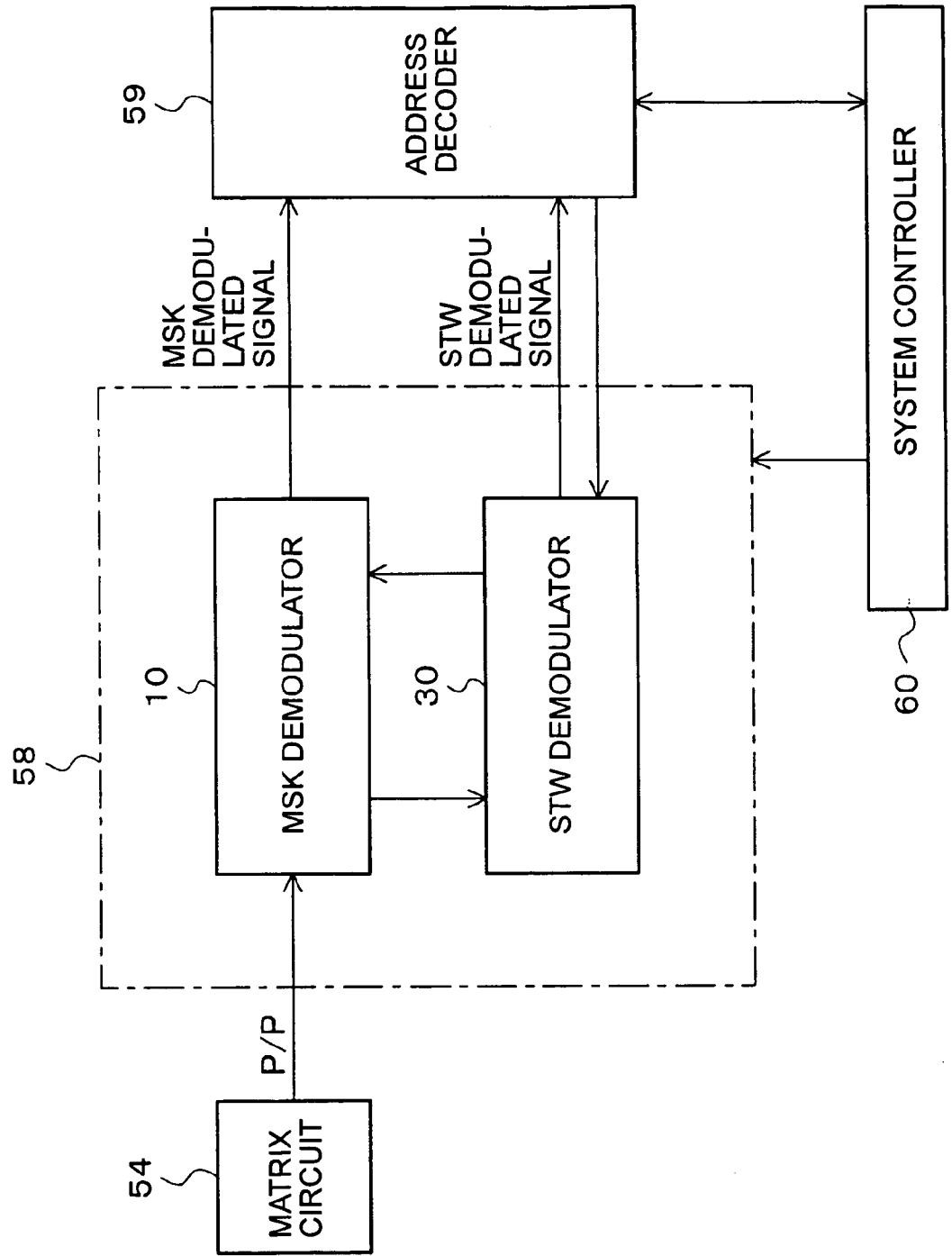
FIG. 6 is a block diagram of a wobble demodulation system of the disk drive device in accordance with one embodiment of the present invention.

FIG. 6 illustrates only a circuit that acquires the ADIP information by demodulating the wobble signal. The push-pull signal P/P from the matrix circuit 54 is supplied to the wobble circuit 58. The wobble circuit 58 includes an MSK demodulator 10 and an STW demodulator 30. The MSK demodulator 10 demodulates wobble data that is a digital version of the push-pull signal P/P, and outputs an MSK demodulated signal. The MSK demodulator 10 supplies STW demodulator 30 with the wobble data that is the digital version of the push-pull signal P/P. The STW demodulator 30 demodulates the input wobble data, thereby outputting an STW demodulated signal. The MSK demodulated signal and the STW demodulated signal are supplied to the address decoder 59. The address decoder 59 decodes the ADIP information, and supplies the decoded ADIP information to the system controller 60.

The MSK demodulator 10 and the STW demodulator 30 in the wobble circuit 58 are described below. The MSK demodulator 10 is described first with reference to FIG. 7 together with FIGS. 8 through 12.

Figure 8:
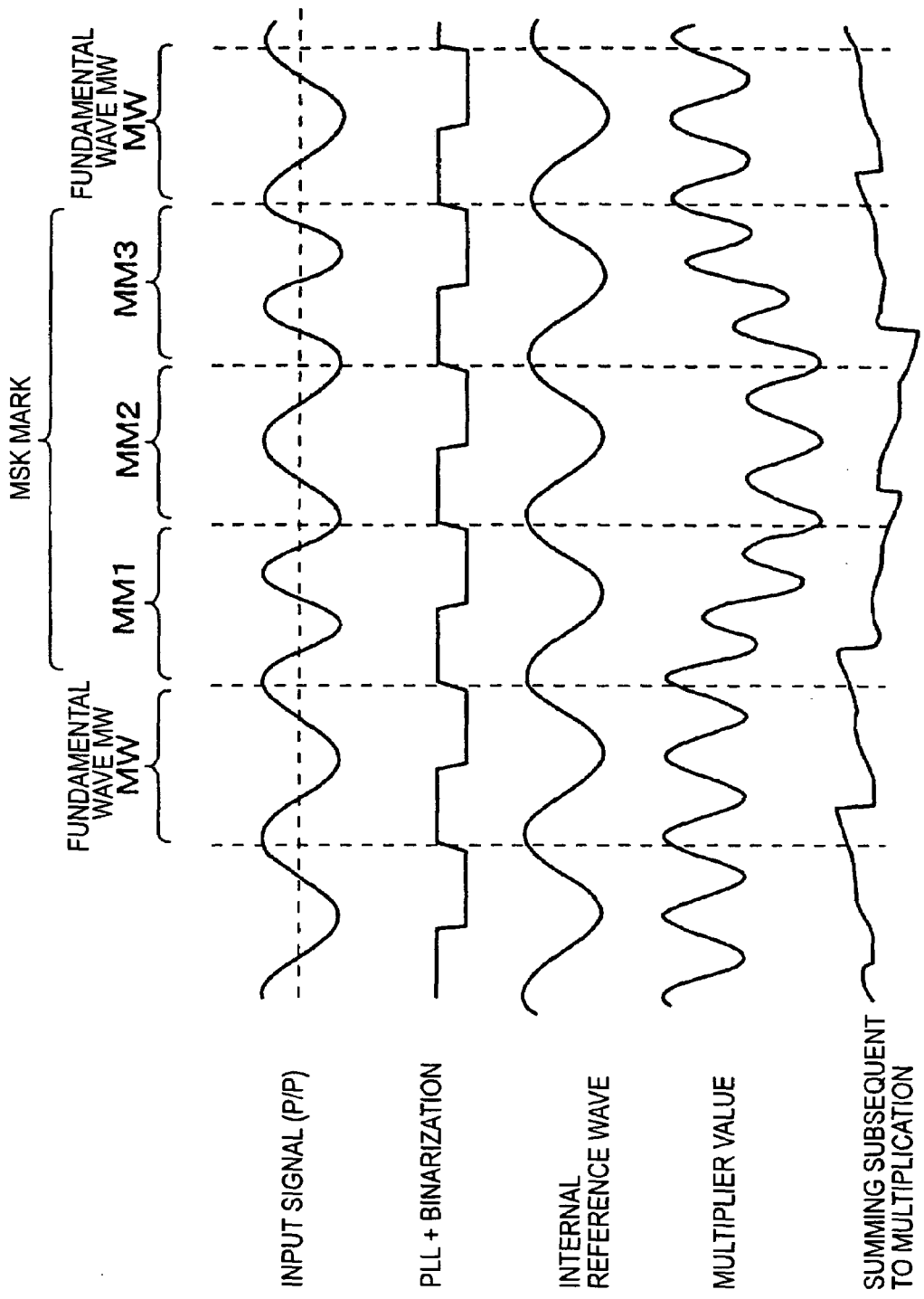
FIG. 8 illustrates an MSK demodulated waveform.

The matrix circuit 54 receives the push-pull signal P/P of FIG. 8 as the modulated signal (wobble signal) of the wobbling groove at a terminal 15*a* thereof. The MSK demodulator 10 supplies the push-pull signal P/P to an A/D converter 11 and a comparator 12.

The comparator 12, composed of an operational amplifier and a comparator amplifier, binarizes the push-pull signal P/P. The binarized push-pull signal P/P is supplied to a PLL 13.

As shown in FIG. 8, the PLL 13 generates a wobble clock (WCK) of the push-pull signal P/P, namely, having a wobble frequency of the modulated signal of the wobbling group. The PLL 13 may be constructed of a digital circuit.

The wobble clock WCK output from the PLL 13 is supplied to the PLL 14 and the delay circuit 16. The wobble clock WCK is also supplied via a terminal 15*b* to the STW demodulator 30 to be discussed later.

The PLL 14 frequency doubles the wobble clock WCK, thereby generating the master clock MCK. The master clock MCK, serving as a sampling clock of the A/D converter 11, is also used by the delay circuit 16, a counter 17, etc. The master clock MCK is also supplied to the STW demodulator 30 via a terminal 15c.

The PLL 14 may be constructed of one of an analog circuit and a digital circuit.

The delay circuit 16 delays the wobble clock WCK by a unit of the master clock MCK. In this case, the delay time is set in accordance with a phase adjustment value supplied from the system controller 60 via an adder 23. The delay circuit 16 delays the wobble clock WCK and uses a rising edge (or a falling edge) of the delayed wobble clock WCK as a reference timing signal for resetting or starting the counter 17 and for clearing an accumulator 27. As will be discussed later, by adjusting the delay time, the delay circuit 16 adjusts the position of an internal reference wave for demodulation to be in phase with the wobble data.

The delay circuit 16 includes, but is not limited to, a selector and a shift register including a flipflop. The delay circuit 16 may also be constructed of a digital counter, or an analog circuit of CR (capacitor and resister) structure. Alternatively, the delay circuit 16 may be composed of a buffer and a selector.

The wobble clock WCK outputted from the delay circuit 16 is fed to the counter 17 as a reset/start signal.

Since the counter 17 counts the master clock MCK, and resets the count thereof at the timing at which the delay circuit 16 supplies the reset/start signal. The counter 17 thus counts the master clock MCK while resetting the count thereof at the edge timing of the delayed wobble clock WCK. The count is outputted to a group of tables 21 as a table address.

The master clock MCK has a frequency of 23 clocks in one period of the wobble fundamental waveform. Since the counter 17 is reset every one period of the wobble fundamental waveform, counts 0-22 are repeatedly generated.

The table group 21 contains eight tables, namely, table TB0 through TB7. The table group 21 may contain any number of tables.

The tables TB0-TB7 are read-only memories (ROMs) storing waveform data serving as the internal reference waveforms, and data is read therefrom in response to the count at the counter 17.

The waveform data of the tables TB0-TB7 is 23 data of TD0-TD22. By successively reading the counts of 0-22, the internal reference wave having the same frequency as the wobble fundamental waveform is generated as the internal reference wave as shown in FIG. 8.

The waveform of the internal reference wave stored in the tables TB0-TBn are sin (sine) wave (or cos (cosine) wave) with one slightly shifted from another in phase. The data TD0-TD22 of the tables TB0-TBn are data representing the waveform of one wobble period with phase shifted from each other. The phase difference between the tables TB0-TBn will be discussed later.

A selector 22 selects one of the tables TB0-TB7 in accordance with the phase adjustment value supplied from the system controller 60 via the adder 23.

The phase adjustment value is an eight bit value. Upper five bits represent an amount of delay of 23 levels in the delay circuit 16, and lower 3 bits represent a selection value of the tables TB0-TB7 selected by the selector 22.

The tables TB0-TB7 successively output waveform data serving as an internal reference wave in response to the count at the counter 17. The internal reference wave from a table TBx selected by the selector 22 is fed to a multiplier 18.

The table group 21 that generates the internal reference wave may have a different structure as long as the table group 21 outputs the waveform data. The system controller 60 may set the waveform data using a random-access memory (RAM). A shift register successively outputting the data stream may be used instead of the table group 21. An analog circuit using an oscillator may be used. Any of a sin signal or cos signal may be used as the generated signal. A circuit generating a rectangular wave may be used.

The counter 17, the table group 21, and the selector 22 form a mechanism for generating the internal reference wave in a variety of phase states. The present invention is not limited to any particular arrangement as long as the mechanism performs the same function. For example, the system controller 60 may set the counter 17 so that the count is incremented or decremented by steps of "n" rather than "1", and "n" tables may be merged into a single table.

The A/D converter 11 samples the push-pull signal P/P inputted via the terminal 15a at the master clock MCK to form digital data. The digital data is fed to the multiplier 18 as the wobble data. The wobble data is also fed to the STW demodulator 30 via a terminal 15d.

The multiplier 18 multiplies the wobble data from the A/D converter 11 by the internal reference wave data from the table TBx selected by the selector 22. The resulting product is shown as a multiplier value in FIG. 8. The product is then supplied to an adder 19.

The adder 19 adds the product from the multiplier 18 to the output from the accumulator 27 composed of a flip-flop, thereby presenting the resulting sum to the accumulator 27. The accumulator 27 is cleared at a timing signal from the delay circuit 16. In other words, the accumulator 27 is reset at the same timing as the reset timing of the counter 17. The accumulator 27 accumulates the sum within one wobble fundamental waveform period. The counter 17 thus repeats an accumulation operation on the product results of the 23 samples.

The accumulated value (value summed subsequent to the multiplication) is shown in FIG. 8. The output of the accumulator 27 is subjected to a positive/negative determination process of a positive/negative determiner 20. The determination result becomes the MSK demodulated signal. The MSK demodulated signal is output to an address decoder 59 via a terminal 15f.

If the accumulator 27 outputs the accumulated value in an complementary expression of 2, the positive/negative determiner 20 outputs the most significant bit of the accumulated value. Another circuit may be used for the positive/negative determiner 20 as long as the circuit determines whether the input value is positive or negative. For example, a comparator may be used for the positive/negative determiner 20.

The adder 19 and the accumulator 27 may be any circuit as long as the circuit accumulates the products of the multiplier 18 in one wobble period. One of a variety of digital circuits or analog circuits may be used.

The STW demodulator 30 supplies the STW optimum phase value to a terminal 15e. The STW optimum value is inputted to a subtracter 25 and an amplitude center measurement circuit 26. The amplitude center measurement circuit 26 measures an amplitude center of the STW optimum phase value. The subtracter 25 substrates the amplitude center value from the STW optimum phase value, thereby determining an STW optimum amount change. The subtracter 25 and the amplitude center measurement circuit 26 form a mechanism for determining the STW optimum phase change, and may have a structure different from these elements. The amplitude center value can be supplied from the system controller 60.

The STW phase change value outputted from the subtracter 25 is gain adjusted by an amplitude adjuster 24. The adder 23 adds the gain adjusted STW phase change value to the phase adjustment value from the system controller 60, thereby supplying the sum to the delay circuit 16 and the selector 22.

In the process of the MSK demodulator 10 as shown in FIG. 8, the value summed subsequent to the multiplication shifts in a positive direction in the wobble fundamental wave (monotone wobble MW) duration in the input wobble signal. On the other hand, the value summed subsequent to the multiplication shifts in a negative direction in the MSK mark period. Performing the positive/negative determination on the sum, a demodulated signal discriminating between the MSK mark and the fundamental wave is obtained.

Figure 9:
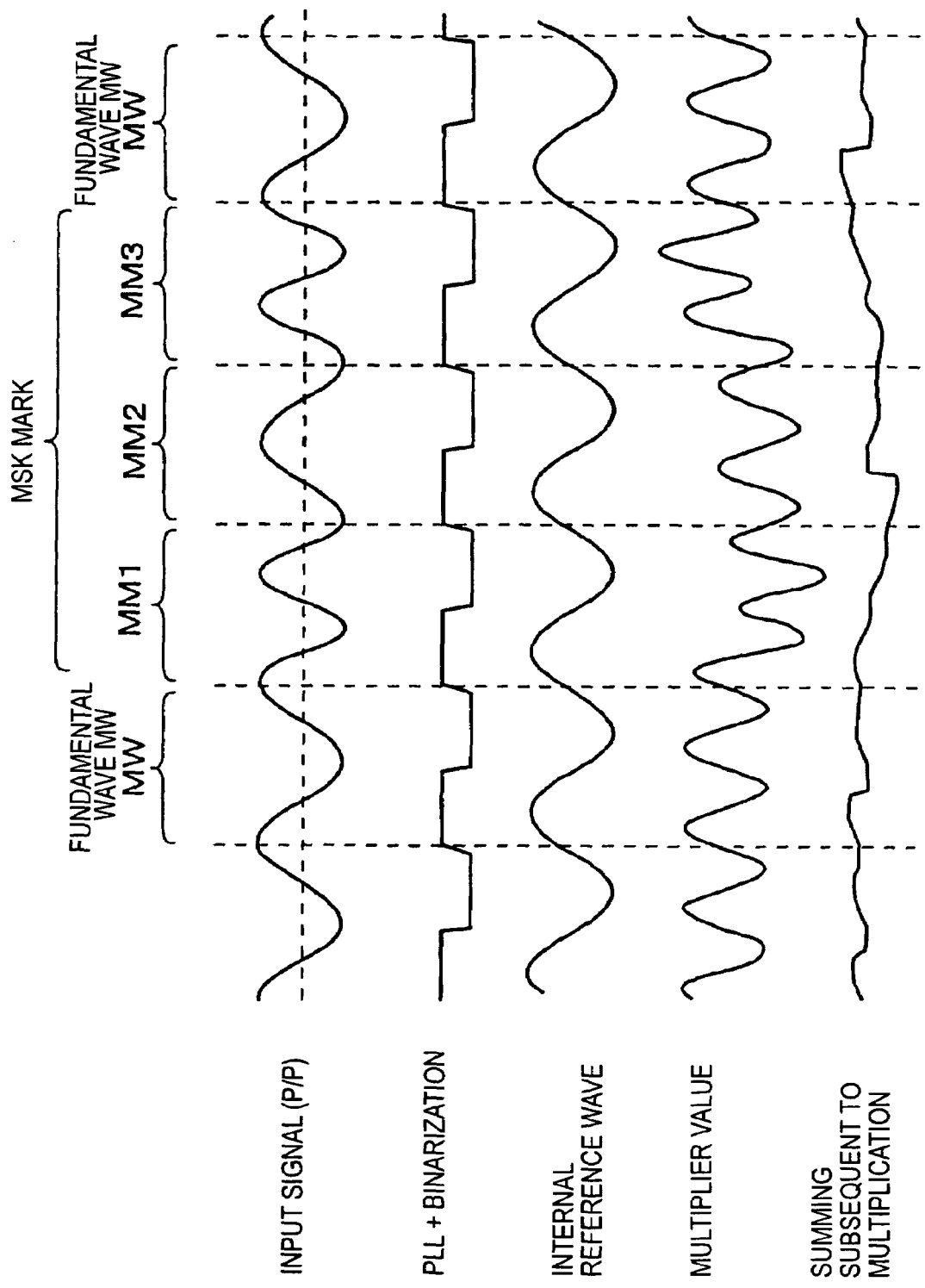
FIG. 9 illustrates an MSK demodulated waveform with phase shifted.

FIG. 8 shows that the wobble data supplied to the multiplier 18 is aligned in phase with the internal reference wave. When the phases are aligned, the best demodulation results are obtained. FIG. 9 illustrates that the push-pull signal P/P (wobble data) is out of phase with the internal reference wave. In the comparison of the value summed subsequent to the multiplication shown in FIG. 9 with the value summed subsequent to multiplication show in FIG. 8, the positive/negative determination in FIG. 9 is subject to error. In other words, demodulation accuracy is degraded by a phase difference between the wobble data and the internal reference wave.

The MSK demodulator 10 adjusts the phase of the internal reference wave in response to an amount of delay in the delay circuit 16 and the table selection by the selector 22.

Figure 10:
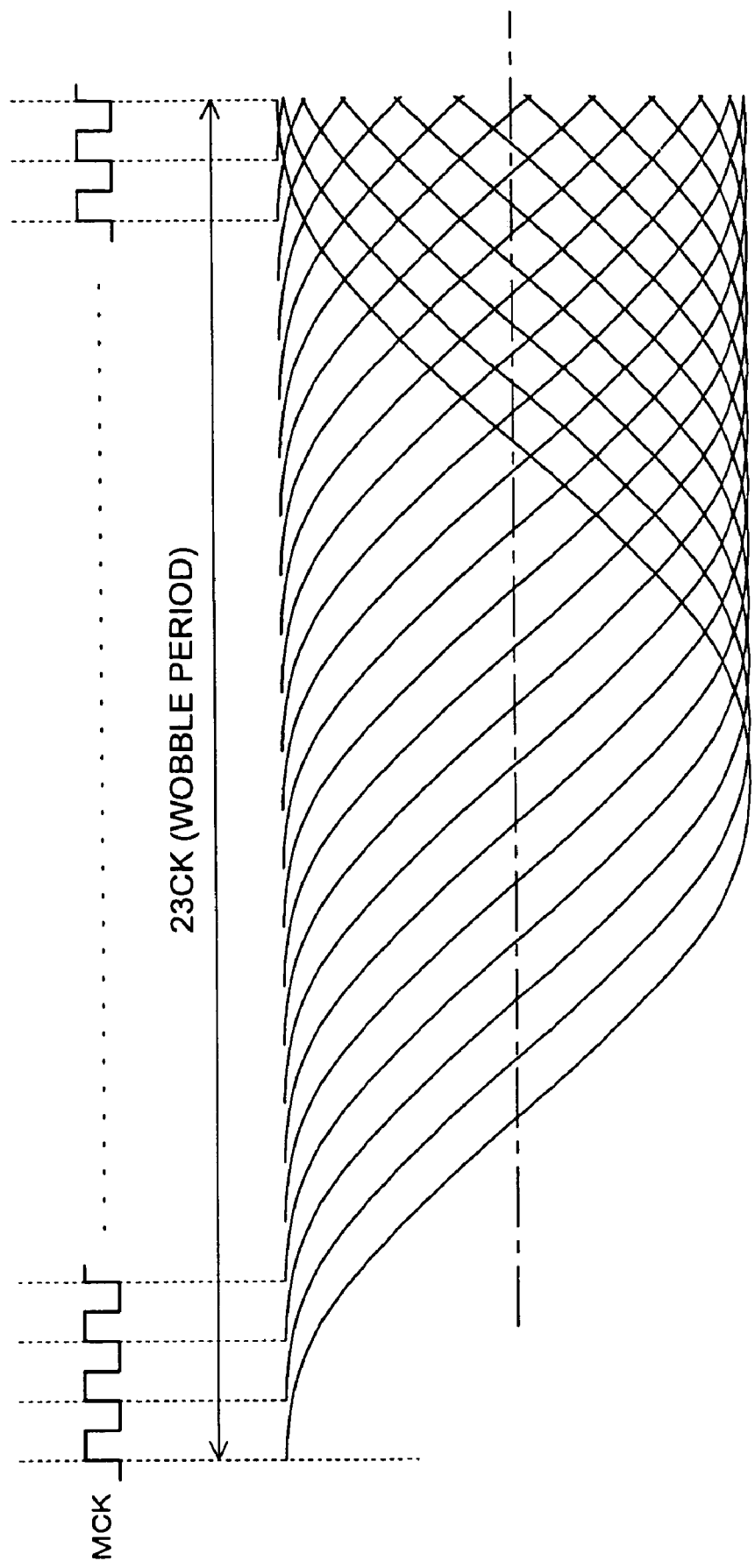
FIG. 10 illustrates phase adjustment by delay time in accordance with one embodiment of the present invention.

The adder 23 adds the STW phase change value (phase adjustment value) based on the STW optimum phase value to the phase adjustment value from the system controller 60. This phase adjustment process will be discussed in more detail later. The phase of the reference wave is adjusted by the phase adjustment value from the system controller 60. The counter 17 is reset at the edge timing of the wobble clock WCK output from the delay circuit 16. If the amount of delay is changed, the reset timing of the counter 17 is changed in 23 steps in the one wobble period. The reset timing of the counter 17 is synchronized with the output timing of the head data TD0 of the data TD0-TD22 of the given TBx. By changing the amount of delay in 23 steps, the phase of the internal reference wave output from the table TBx is varied in 23 steps within one wobble period. For example, FIG. 10 illustrates a phase adjustment process that is performed in step of 1/23 period unit in a delay time adjustment on the internal reference wave output from the given TBx.

In addition to the phase adjustment of the delay circuit 16, a fine phase adjustment is performed by selecting the tables TB0-TB7.

If the input push-pull signal P/P has a waveform that always zero-crosses at the location of the master clock MCK, the phase adjustment of the delay circuit 16 alone is sufficient. A delay in the function of circuits can shift the timing of an internal operation clock sampling. If the operational frequency is lowered, a sampling interval is widened, and a phase difference increases. The sample frequency becomes relatively low in a high data rate, in particular. The phase of the wobble signal waveform and the phase of the internal reference wave become greatly different. For this reason, the phase adjustment finer than the master clock unit needs to be performed.

The table TB0-TB7 are intended to perform the phase adjustment finer than the master clock unit. The eight tables TB0-TB7 prepare the internal reference waves with one clock period successively shifted by 1/8 period unit.

Figure 11:
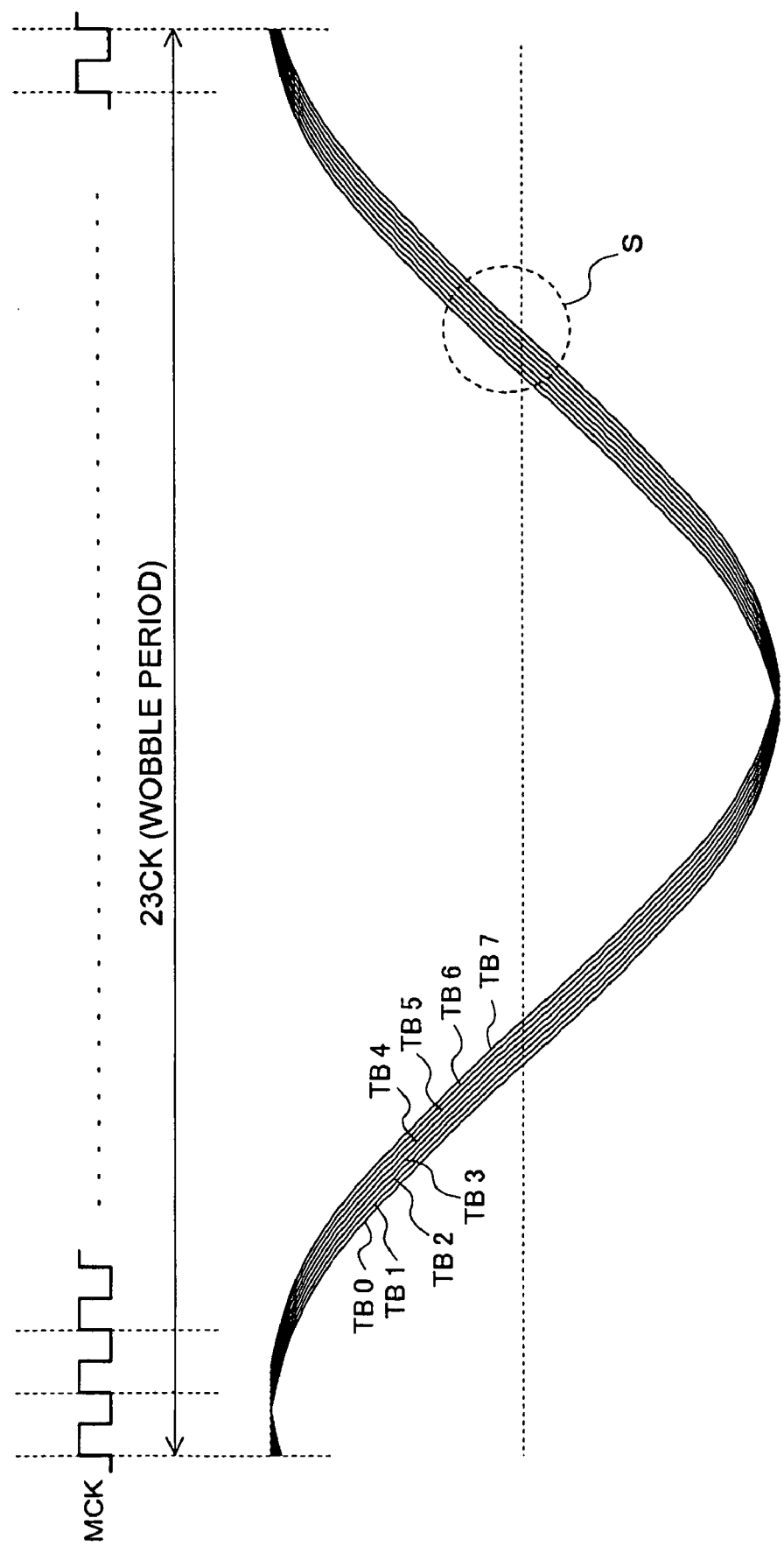
FIG. 11 illustrates the phase adjustment by table selection in accordance with one embodiment of the present invention.
Figure 12:
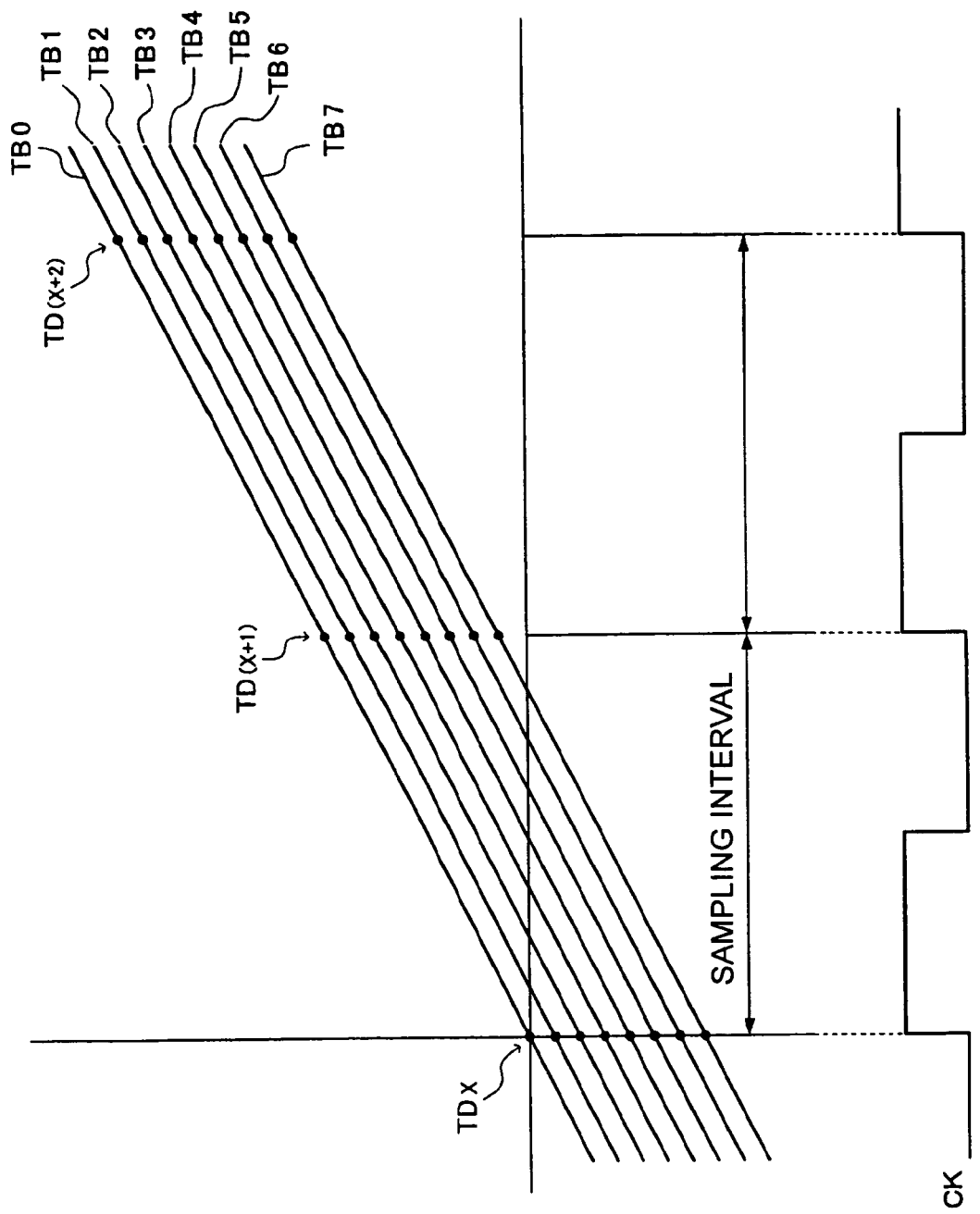
FIG. 12 illustrates a phase of each table in accordance with one embodiment of the present invention.

FIG. 11 illustrates the waveform data stored in the tables TB0-TB7. As shown in FIG. 11, the data stored in the tables TB0-TB7 is shifted in phase by 1/8 MCK period. FIG. 12 illustrates, in enlargement, a portion encircled in a broken-lined circle S of FIG. 11. As clearly shown in FIG. 12, the data in the tables TB0-TB7 is arranged so that phase is shifted within the sampling interval by the master clock MCK.

The finer phase adjustment is performed when the selector 22 selects one table from the table group 21. In other words, with the eight tables TB0-TB7, the phase adjustment as accurate as the level achievable with a frequency eight times the sampling frequency is performed without actually heightening the sampling frequency (master clock frequency).

The number of tables is calculated as follows:

$$\text{Number of tables} = (1/2) \cdot 2^{ADB} \times \sin(2\pi/S)$$

where ADB represents the number of bits of the A/D converter 11, and S represents the number of samples in one period of the input signal. When the number of bits of the A/D converter 11 is 6 bits, and the number of samples in the one period of the input signal is 23, the number of tables becomes 8.6. The number of tables is thus preferably 8 or 9.

The system controller 60 performs the phase adjustment of the internal reference wave by controlling the amount of delay in the delay circuit 16 and controlling the selection operation of the selector 22.

The phase adjustment is performed in a test phase of the disk drive device subsequent to the manufacture of the device.

For example, the system controller 60 performs a reproduction process with the upper five bits of the phase adjustment value with successively shifted, and monitors an error rate of the ADIP information obtained from the address decoder 59. In other words, with the amount of delay of the delay circuit 16 successively varied, the error rate responsive to the delay time is monitored. The delay time causing an optimum error rate is determined, and the upper five bits are determined.

Similarly, the reproduction process is performed with the value of the lower 3 bits successively changed. The error rate of the ADIP information obtained from the address decoder 59 is monitored. In other words, with the tables TB0-TB7 successively switched, the error rate is monitored in each selected table. The optimum table is determined, and the corresponding value of the upper 3 bits is thus determined.

When the amount of delay and the table are set in this way, the internal reference wave given to the multiplier 18 has the optimum phase state, i.e., the most in-phase state with the wobble data given to the multiplier 18.

With the tables TB0-TB7 prepared, the phase of the internal reference wave is accurately adjusted without the need for heightening the sampling frequency. The accuracy of the MSK demodulation is thus heightened.

After such an adjustment is performed in the disk drive device in the manufacturing phase thereof, the disk drive device is fixed to that adjustment state. This is because the phase shifting of the input signal with respect to the clocking timing is due to characteristic of circuit elements, and the phase shift to be adjusted by the tables TB0-TB7 is substantially fixed.

The basic adjustment alone cannot cope with variations due to external disturbance. To this end, the MSK demodulator 10 performs the phase adjustment using the STW optimum phase value. The adder 23 adds the phase adjustment value responsive to the STW optimum phase value to the phase adjustment value from the system controller 60. In this way, the phase of the internal reference wave is automatically adjusted during the reproduction operation. This operation will be discussed later.

Figure 13:
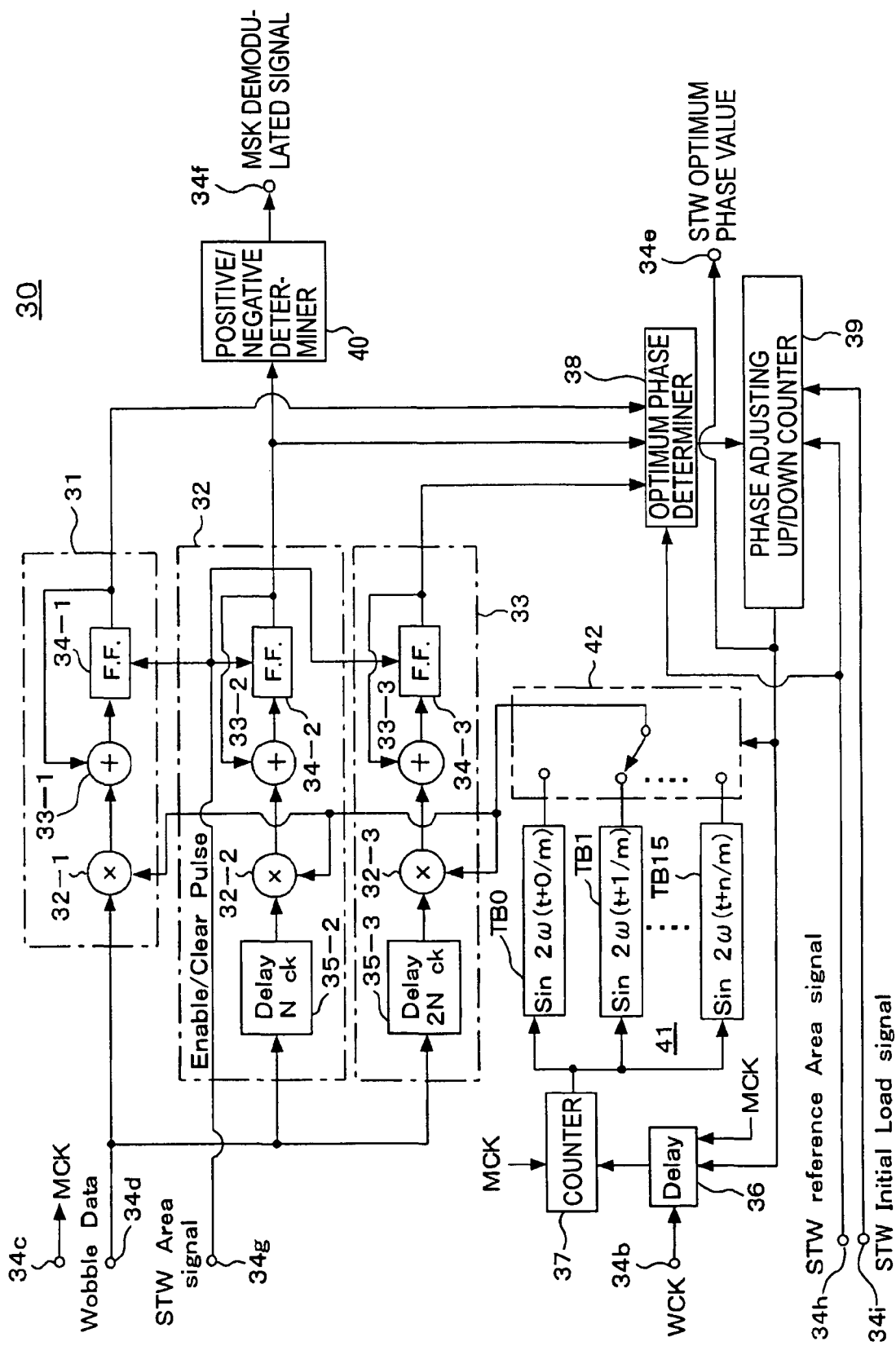
FIG. 13 is a block diagram of the STW demodulator in accordance with one embodiment of the present invention.
Figure 14:
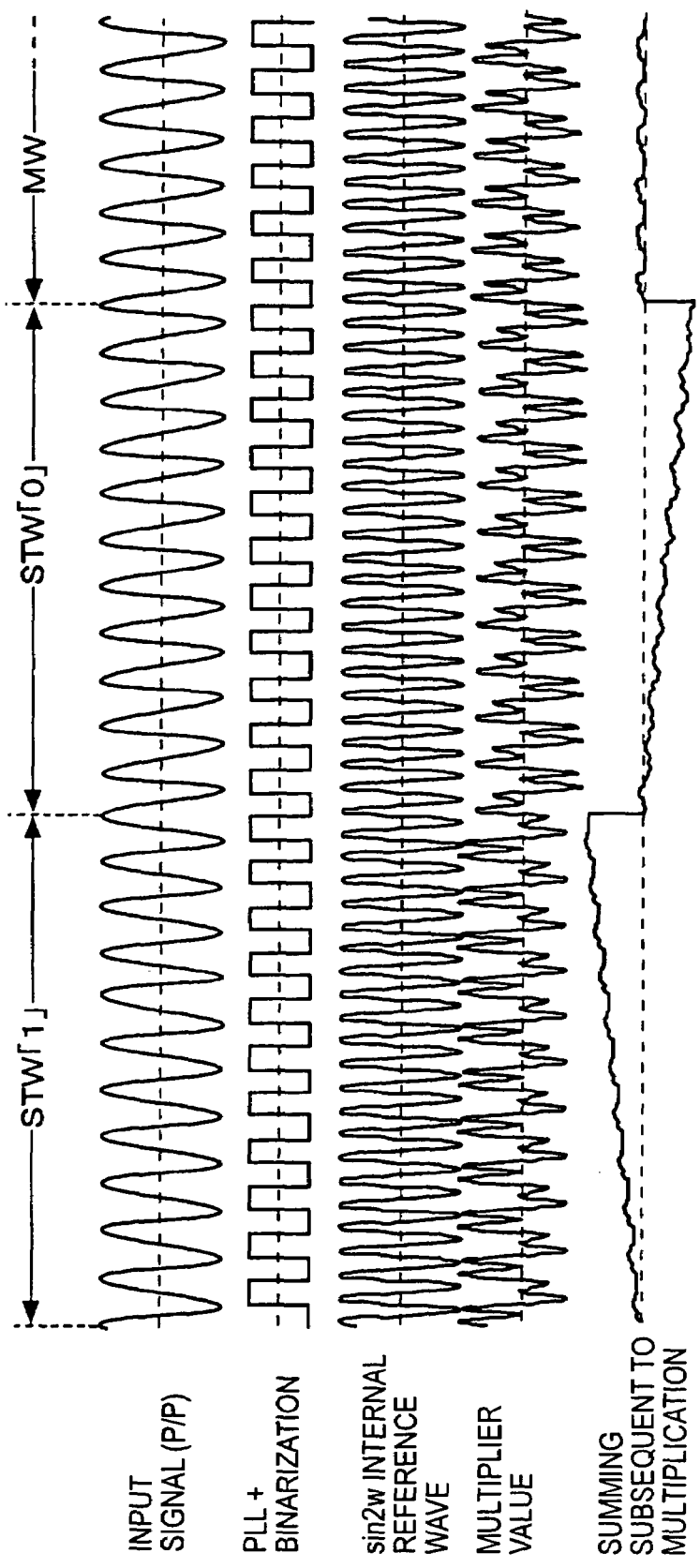
FIG. 14 illustrates an STW demodulated waveform.
Figure 15:
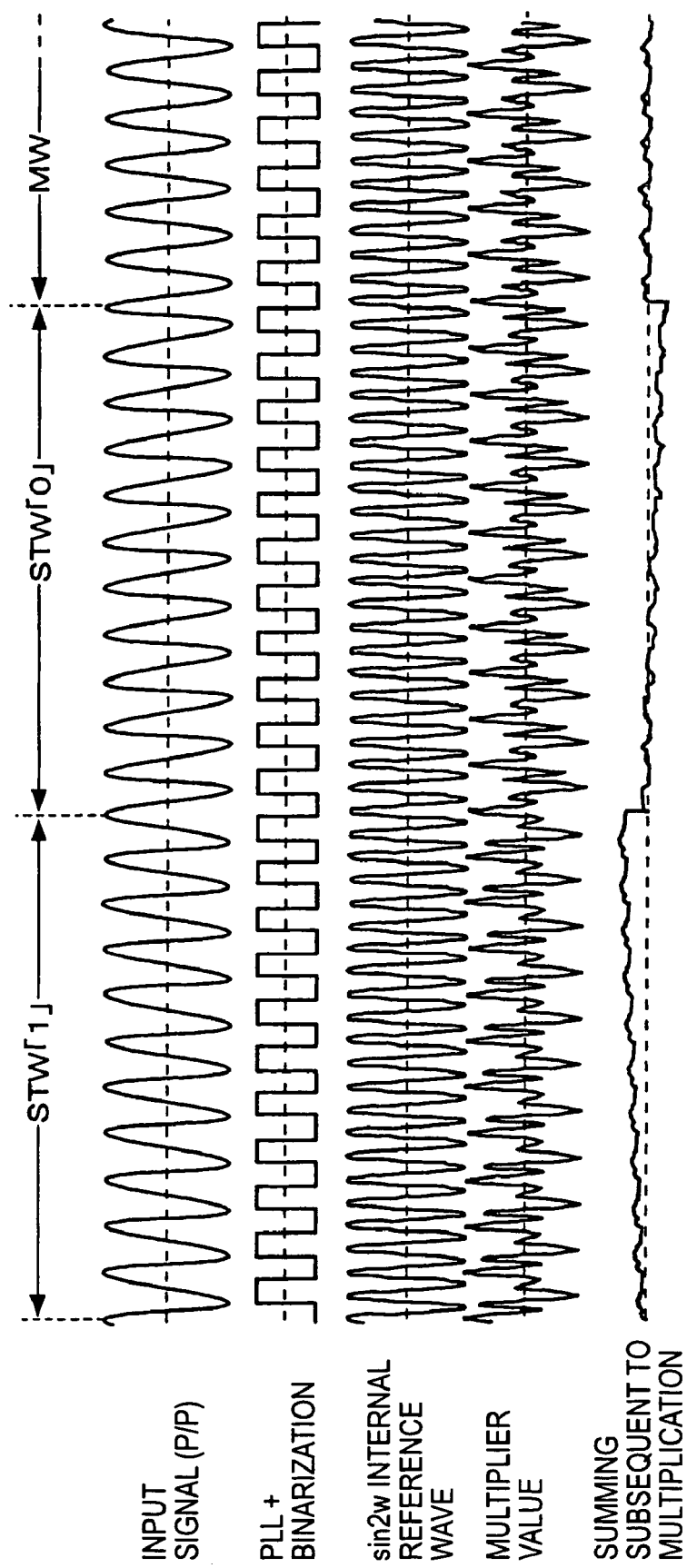
FIG. 15 illustrates an STW demodulated waveform with phase shifted.
Figure 16:
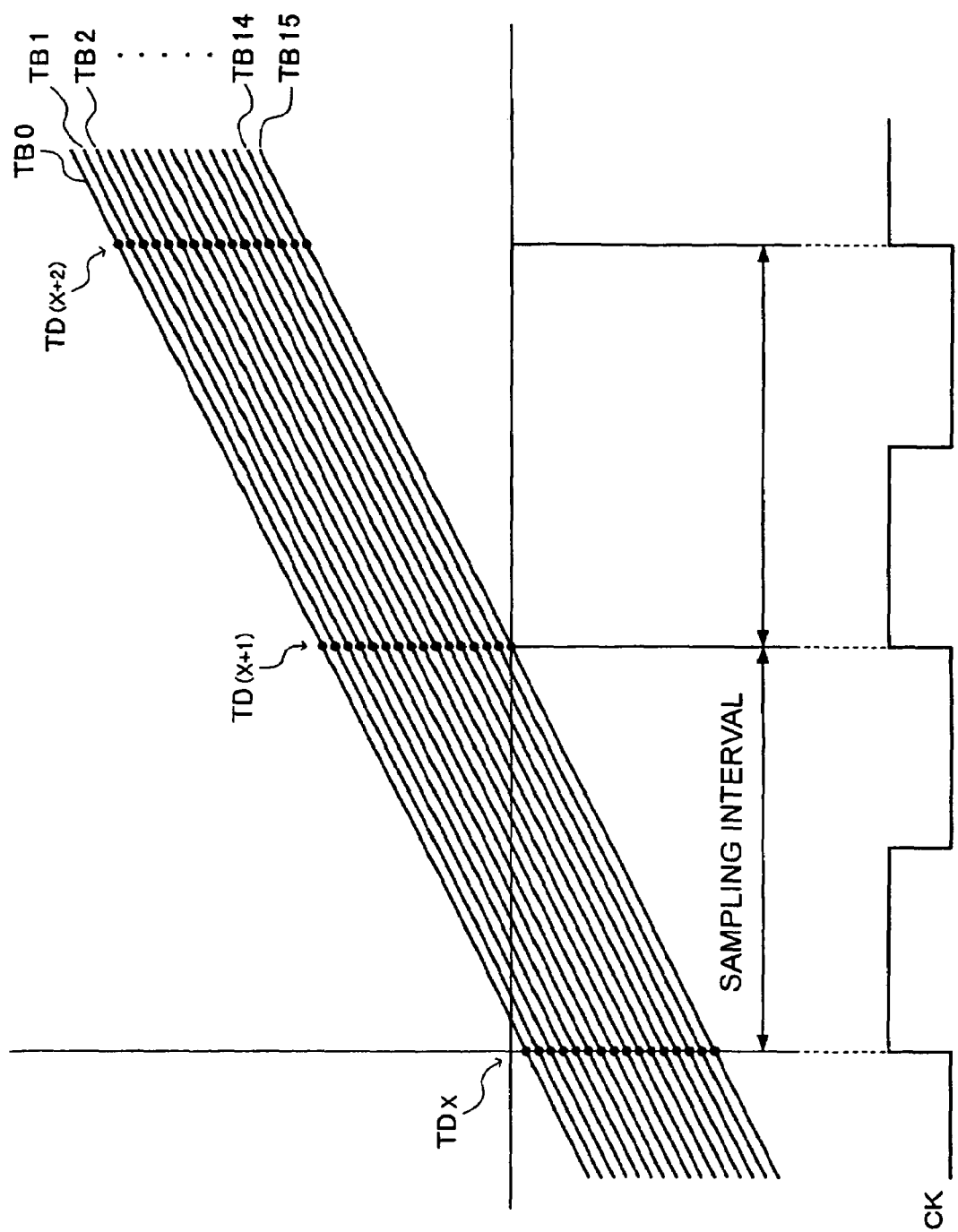
FIG. 16 illustrates a phase of each table in accordance with one embodiment of the present invention.

FIG. 13 illustrates the structure of the STW demodulator 30 of FIG. 6. With reference to FIGS. 14-16, the STW demodulator 30 is described below.

The wobble data obtained from the A/D converter 11 in the MSK demodulator 10 is fed to the STW demodulator 30 via the terminal 15d, and is input to a terminal 34d of FIG. 13. FIG. 14 illustrates the wobble data (push-pull signal P/P) as the input signal.

The STW demodulator 30, as a demodulation circuit system, includes a first demodulator 31, a second demodulator 32, and a third demodulator 33.

The demodulator 31 includes a multiplier 32-1, an adder 33-1, and an accumulator 34-1. The second demodulator 32 includes a multiplier 32-2, an adder 33-2, and an accumulator 34-2. The third demodulator 33 includes a multiplier 32-3, an adder 33-3, and an accumulator 34-3.

The second demodulator 32 includes a delay circuit 35-2 providing N-clock time of the master clock MCK, and the third demodulator 33 includes a delay circuit 35-3 providing 2N-clock time of the master clock MCK (N is a set value other than 0).

The input wobble data is fed to the multiplier 32-1 in the first demodulator 31. The input wobble data is fed to the multiplier 32-2 in the second demodulator 32 with N-clock time delayed. The input wobble data is fed to the multiplier 32-3 in the third demodulator 33 with 2N-clock time delayed.

The internal reference wave is fed to the multipliers 32-1, 32-2, and 32-3 via a selector 42. The internal reference wave is sin wave or cos wave as the second harmonic wave of the wobble fundamental waveform.

The wobble clock WCK (PLL+binarization), shown in FIG. 14, output from the terminal 15d in the MSK demodulator 10, is input to the terminal 34d in the STW demodulator 30. The master clock MCK output from the terminal 15c in the MSK demodulator 10 is inputted via a terminal 34c, and serves as a reference clock in the STW demodulator 30.

The wobble clock WCK from a terminal 34b is fed to a delay circuit 36. The delay circuit 36 delays the wobble clock WCK by a predetermined delay time according to a unit of the master clock MCK, and supplies the delayed wobble clock WCK to a counter 37.

The counter 37 counts the master clock MCK, and resets and starts the count thereof at the timing of the rising edge (or the falling edge) of the wobble clock WCK from the delay circuit 36. More specifically, the counter 37 counts the master clock MCK in response to the reset timing of the wobble clock WCK, and outputs the count to a table group 41 as a table address.

The master clock MCK has a frequency of 23 clocks in one period of the wobble fundamental waveform. Since the counter 37 is reset every one period of the wobble fundamental waveform, counts 0-22 are repeatedly generated.

The table group 41 contains fifteen tables, namely, table TB0 through TB15. The tables TB0-TB7 are read-only memories (ROMs) storing waveform data, each serving an internal reference waveform, and data is read therefrom in response to the count at the counter 37.

The waveform data stored in the tables TB0-TB15 is 23 pieces of data TD0-TD22. In response to a count of 0 through 22, the TD0-TD22 is successively read so that the internal reference wave as the second harmonic of the wobble fundamental waveform is generated as the wave summed subsequent to the multiplication shown in FIG. 14.

The internal reference waves stored in the tables TB0-TB15 are slightly phase shifted one from another. The data TD0-TD22 in the TB0-TB15 show the waveforms with phase shifted within one wobble period.

FIG. 16 shows waveforms of the data of the TB0-TB15 phase shifted in the vicinity of the zero-crossings as in FIG. 12. The tables TB0-TB15 thus have data TD with phase shifted in accordance with the master clock MCK within the sampling interval.

The number of tables is calculated as follows:

Number of tables=(½)·2$ADB$×sin (4π/$S$)

where ADB represents the number of bits of the A/D converter 11, and S represents the number of samples in one period of the input signal. When the number of bits of the A/D converter 11 is 6 bits, and the number of samples in the one period of the input signal is 23, the appropriate number of tables becomes 16.

The tables TB0-TB15 are used to generate the internal reference wave of sin(2ωt) or cos(2ωt) having a frequency twice the wobble fundamental frequency for demodulating the STW signal. The tables TB0-TB15 are not limited to the ROM table. The tables TB0-TB15 may be a RAM table, or an analog circuit using an oscillator.

A selector 42 selects one of the tables TB0-TB15. In response to the count from the counter 37, the tables TB0-TB15 successively output the waveform data serving as the internal reference wave. The internal reference wave from the table TBx selected by the selector 42 is supplied to each of the multipliers 32-1, 32-2, and 32-3.

The wobble data is supplied to each of the multipliers 32-1, 32-2, and 32-3 in the first demodulator 31, the second demodulator 32, and the third demodulator 33, respectively, at the timings respectively delayed by N clock times. The three wobble data in different timings are respectively multiplied by the internal reference waves in the multipliers 32-1, 32-2, and 32-3. The resulting products are shown as the multiplier value in FIG. 14.

As in an operation by the MSK demodulator 10, the first demodulator 31, the second demodulator 32, and the third demodulator 33 accumulate the products using the adders 33-1, 33-2, and 33-3, and the accumulators 34-1, 34-2, and 34-3, respectively.

Flipflops as the accumulator 34-1, the accumulator 34-2, and the accumulator 34-3 are controlled in an enable/clear control process in response to an STW area signal supplied from a terminal 34g from the subsequent address decoder 59.

The accumulators 34-1, 34-2, and 34-3 are controlled so that the products are accumulated within a range of the STW modulated signal of the ADIP unit of FIG. 3B. The accumulators 34-1, 34-2, and 34-3 are reset every ADIP unit. For example, the accumulators 34-1, 34-2, and 34-3 accumulate the products within a range from wobble numbers 18 through 54. The accumulated value is the one labeled as summing subsequent to the multiplication in FIG. 14.

The accumulated value from each of the accumulators 34-1, 34-2, and 34-3 is supplied to an optimum phase determiner 38. The output of the accumulator 34-2 in the second demodulator 32 is supplied to a positive/negative determiner 40.

The positive/negative determiner 40 performs a positive/negative determination process on the accumulated value of the accumulator 34-2, and supplies the determination results as the STW demodulated signal to the subsequent address decoder 59 via a terminal 34f. The second demodulator 32 becomes a main demodulation circuit for supplying the STW demodulated signal to the address decoder 59.

As shown in FIG. 14, the value summed subsequent the multiplication varies in a positive direction in the STW modulated wave having the "1" in response to the input modulated signal. On the other hand, the value summed subsequent the multiplication varies in a negative direction in the STW modulated wave having the "0" in response to the input modulated signal. During the monotone wobble period, the value summed subsequent to the multiplication remains substantially zero. By performing the positive/negative determination process, the STW demodulated signal is obtained.

FIG. 14 illustrates the state in which the wobble data given to the multiplier 32-1 matches in phase the internal reference wave (second harmonic wave). The best demodulation result is obtained when the two data are in phase with each other. FIG. 15 illustrates similar waveforms. As shown in FIG. 15, the wobble data given to the multiplier 32-2 is out of phase with the internal reference wave. As shown in FIG. 15, the value summed subsequent to the multiplication becomes unclear as to whether the summed value is positive or negative. The positive/negative determiner 40 is thus unable to perform the positive/negative determination process, and demodulation accuracy is degraded.

In accordance with the embodiment of the present invention, the adjustment of the delay time in the delay circuit 36 and the selection of the tables TB0-TB15 by the selector 42 permit automatic fine phase adjustment.

The first demodulator 31 and the third demodulator 33, in addition to the second demodulator 32 as the main demodulation circuit system, the optimum phase determiner 38 and the phase adjusting up/down counter 39 are arranged to perform the automatic phase adjustment for aligning the phase of the wobble data given to the multiplier 32-2 of the second demodulator 32 with the phase of the internal reference wave.

The optimum phase determiner 38 references the accumulation results of the accumulators 34-1, 34-2, and 34-3 in the respective first, second and third demodulators 31, 32, and 33 in an STW reference period to determine the optimum phase from the phases of the accumulators 34-1, 34-2, and 34-3. Based on the determination, the optimum phase determiner 38 instructs the phase adjusting up/down counter 39 to count up, count down, or hold the count. The optimum phase determiner 38 is composed of a comparator.

The STW reference period refers to the STW modulated signal period (wobble numbers 18-54) of the reference unit of FIG. 3B. As shown in FIG. 4, the reference unit appears repeatedly within 83 ADIP units. Whether it is an STW reference period is indicated by an STW reference area signal supplied from the address decoder 59 via a terminal 34h.

The address decoder 59 generates the STW reference area signal and the STW area signal by determining the timing of each ADIP unit in response to the MSK demodulated signal, and supplies the STW reference area signal and the STW area signal to the STW demodulator 30.

The phase adjusting up/down counter 39 counts up, count down, or holds the count thereof in response to an instruction from the optimum phase determiner 38.

The count at the phase adjusting up/down counter 39 is supplied to the delay circuit 36, the selector 42, and a terminal 34e as an STW optimum phase value.

The phase adjusting up/down counter 39 includes a count discontinuity prevention mechanism (to prevent the count from shifting to a negative value). For example, a count initial value is loaded by supplying an initial load signal to a terminal 34i from the system controller 60 as will be discussed later.

The delay circuit 36 sets a delay time in response to an upper bit of the count (STW optimum phase value) supplied from the phase adjusting up/down counter 39. The selector 42 selects one from the tables TB0-TB7 in response to a lower bit of the count (STW optimum phase value) supplied from the phase adjusting up/down counter 39.

The STW demodulator 30 is basically identical in operation to the MSK demodulator 10 and the detailed discussion thereof is omitted herein. The phase of the internal reference wave is adjusted according to the master clock MCK unit in the delay circuit 36. By selecting one from the tables TB0-TB15, the internal reference wave is adjusted according to a 1/16 unit of the master clock MCK.

In the automatic phase adjustment, the STW demodulator 30 shifts the phase of the internal reference wave to an optimum value while monitoring the demodulation results of the three modulators of the first, second, and third demodulators 31, 32, and 33.

The first demodulator 31, the second demodulator 32, and the third demodulator 33 are supplied with the wobble data shifted in timing from each other. The first demodulator 31, the second demodulator 32, and the third demodulator 33 are different from each other in the phase shift state between the wobble data and the internal reference wave. The phase state in the second demodulator 32 is optimized by causing the optimum phase determiner 38 to determine which demodulation system is in the optimum phase state.

The optimum phase determiner 38 causes the phase adjusting up/down counter 39 to count up or down in the direction toward the best one of the accumulation results of the first demodulator 31, the second demodulator 32, and the third demodulator 33 in response to the end of the STW reference period indicated by the STW reference area signal from the address decoder 59.

If the phase state of the first demodulator 31 having the wobble data most led with respect to the internal reference wave is optimum, the phase adjusting up/down counter 39 is caused to count down. The phase of the internal reference wave is adjusted to lead so that the phase states match in the second demodulator 32. If the phase state of the third demodulator 33 having the wobble data most lagged with respect to the internal reference wave is optimum, the phase adjusting up/down counter 39 is caused to count up, for example. The phase of the internal reference wave is adjusted to lag so that the phase states in the second demodulator 32 match. If the phase state in the second demodulator 32 is optimum, the phase adjusting up/down counter 39 is held. More specifically, if the phase state in the second demodulator 32 is optimum, the internal reference wave remains unchanged in phase.

The adjustment operation is performed in this way. The phase state in the second demodulator 32 is automatically forced to the optimum state, and STW demodulation performance is heightened.

High accuracy automatic phase adjustment is possible by selecting one table from the table group 41 in addition to the delay time adjustment in the delay circuit 36 without setting the sampling frequency (master clock MCK) to a high frequency.

The automatic adjustment accuracy level (resolution) depends on the frequency of the master clock MCK, the number of tables in the table group 41, and the setting of the delay time (N) of the delay circuit 35-2 and the delay circuit 35-3. In view of adjustment accuracy requirements, the apparatus is properly designed. As shown in FIG. 13, the delay circuit 35-2 in the second demodulator 32 and the delay circuit 35-3 in the third demodulator 33 delay the wobble data. Alternatively, the internal reference waves given to the multiplier 32-2 and the multiplier 32-3 may be delayed without delaying the wobble data. With this arrangement, the operation of the STW demodulator 30 remains unchanged.

The MSK demodulator 10 adjusts the phase of the internal reference wave to the optimum initial value in accordance with the phase adjustment value from the system controller 60. In the STW demodulator 30, the phase state of the second demodulator 32 is automatically adjusted to the optimum state thereof.

Phase shifting due to external disturbance cannot be adjusted without performing automatic adjustment in the MSK demodulator 10. For this reason, the phase adjustment is also performed in the MSK demodulator 10 using the STW optimum phase value obtained in the STW demodulator 30.

Figure 7:
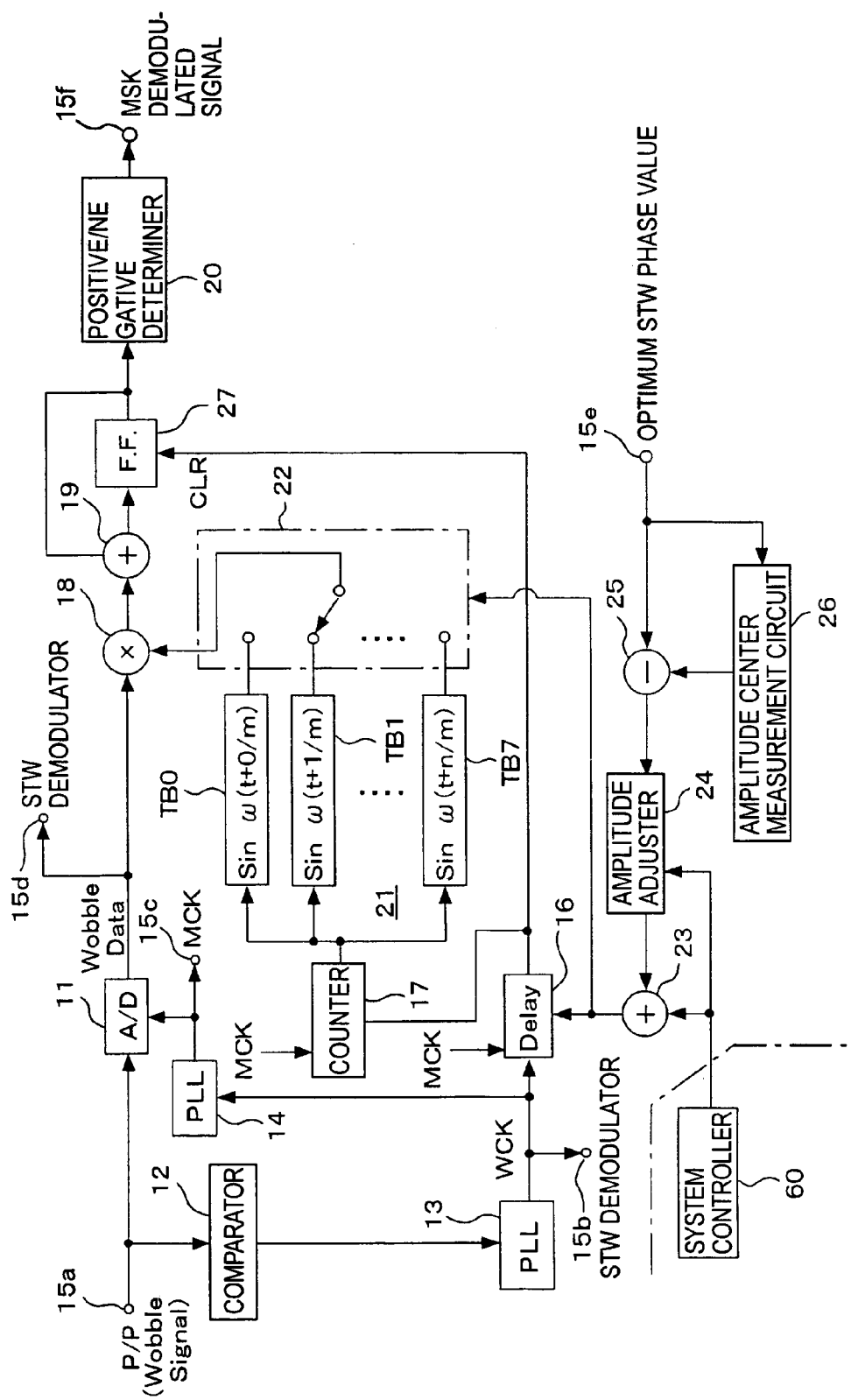
FIG. 7 is a block diagram of an MSK demodulator in accordance with one embodiment of the present invention.

The STW optimum phase value output from the terminal 34e of FIG. 13 is inputted to the an terminal 15e of the MSK demodulator 10 of FIG. 7 to be fed to the amplitude center measurement circuit 26 and the subtracter 25.

The adder 23 adds the phase adjustment value, subjected to the subtraction and gain adjusted by the amplitude adjuster 24, namely, the phase adjustment value based on the STW optimum phase value, to the phase adjustment value from the system controller 60.

The phase adjustment value from the adder 23 is supplied to the delay circuit 16 and the selector 22 to adjust the phase of the internal reference wave. The MSK demodulator 10 also automatically performs the phase adjustment during recording and reproduction.

The STW modulated signal and the MSK modulated signal are modulated signals in the wobble signal and are generally equally subject to phase shifting in disks that has large variations in disk characteristics, and large beat noise caused by leakage from an adjacent track, or suffer disturbance caused by focus offset. The MSK demodulator 10 performs the phase adjustment in response to the phase shifting due to external disturbance by using the STW optimum phase value. The MSK demodulation performance is even more improved.

FIGS. 17A and 17B illustrate the MSK demodulated waveform (the accumulated output waveform of the accumulator 27). FIG. 17A illustrates the MSK demodulated waveform that is not phase adjusted with the STW optimum phase value. FIG. 17B illustrates the MSK demodulated waveform that is phase adjusted using the STW optimum phase value. The variations in the amplitude of the MSK demodulated wave is controlled, and the demodulation performance is improved.

Since the STW optimum phase value is used, the MSK demodulator 10 is free from a mechanism that determines the optimum phase using the three demodulators. The wobble circuit 58 requires no complex structure.

The MSK demodulator 10 adjusts the phase shift in response to external disturbance, thereby reducing the occurrence of address error. Reliable recording and reproduction are performed even on recording and reproducing media having large variations in characteristics thereof.

The manufacturing yield of the optical disk 1, which could be degraded by variations in characteristics of the optical pickup 51, is improved because of heightened MSK and STW demodulation performance.

As previously discussed, the phase adjusting up/down counter 39 includes the count discontinuity prevention mechanism (to prevent the count from shifting to a negative value).

The count discontinuity prevention mechanism is described herein. The phase adjustment of the internal reference wave is basically a delay time adjustment. The selection of the tables TB0-TB15 in the table group 41 is also referred to as a delay time adjustment according a unit of 1/16 of the master clock MCK. The count at the phase adjusting up/down counter 39 indicates a delay time. The delay circuit 36 performs the phase adjustment within a range of the 23 clock time (a delay time of the 23 clock time equals a phase delay of 0 clock time), and the table group 41 includes 16 tables of TB0-TB15. If the count corresponds to a phase adjustment resolution, the phase of the internal reference wave corresponding to a count 0 and the phase of the internal reference wave corresponding to a count 368 remain equal to each other because 23×16=368. In the STW demodulator 30, the two periods fall within the one wobble duration because the internal reference wave is the second harmonic wave $\sin(2\omega t)$ of the wobble signal. The phase at the count 184 is thus equal to the phase at the count 0. The count 184 and the count 368, each having the same phase as the count 0, are respectively referred to as a first period value and a second period value.

Figure 18A:
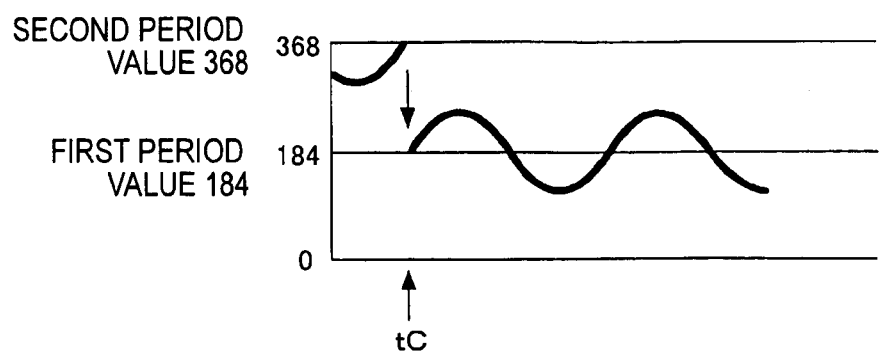
FIGS. 18A-18D are flowcharts of the process of the up-down counter.
Figure 18B:
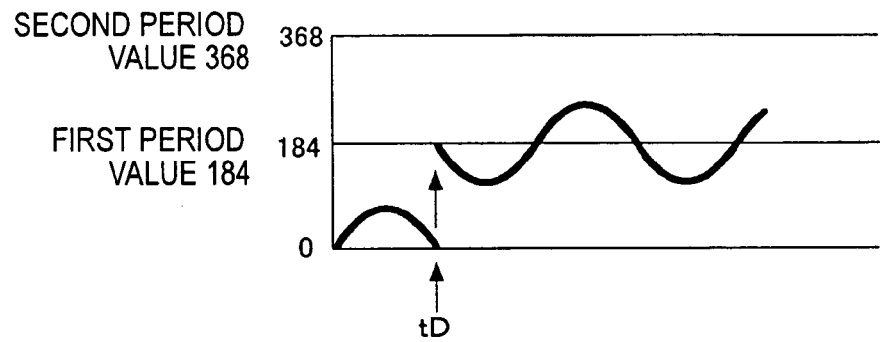
Figure 18C:
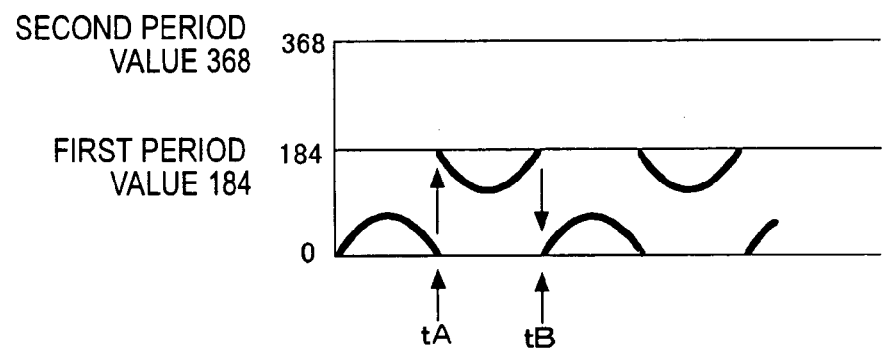

FIGS. 18A-C show the transition of the count of the phase adjusting up/down counter 39. If no initial value is loaded, the initial count is not known.

FIGS. 18A and 18B illustrate the transition of the count when the count discontinuity prevention mechanism is used. FIG. 18C illustrates the transition of the count without the count discontinuity prevention mechanism.

The operation without the count discontinuity prevention mechanism is described first.

The count as the STW optimum phase value, used by the delay circuit 36 and the selector 22 in the delay time control, cannot take a negative value. However, the zero value and the first period value (=184) have the same phase state. As shown in FIG. 18C, the phase adjusting up/down counter 39 starts counting with the initial value 0, and then counts up and then down, and then reaches the zero value at time tA. The phase adjusting up/down counter 39 further counts down. At this point of time, the phase adjusting up/down counter 39 counts down with the count set to 183. When the phase adjusting up/down counter 39 counts up in a direction beyond 183 at time tB, the count is set to 0.

In the phase adjustment of the STW demodulator 30, the phase adjusting up/down counter 39 cannot take a negative count for the delay adjustment. It is sufficient if the phase adjustment is performed with the delay time set within a range from 0 to 183. No problem is caused even if a discontinuity takes place in the count as shown in FIG. 18C.

If the count, namely, the STW optimum phase value is transferred to the MSK demodulator 10, such a count discontinuity is inappropriate.

As already discussed with reference to FIG. 7, the STW optimum phase value supplied to the terminal 15e in the MSK demodulator 10 is measured for the amplitude center by the amplitude center measurement circuit 26. The subtracter 25 subtracts the amplitude center value from the STW optimum phase value, thereby determining an STW phase change value. The STW phase change value is adjusted into the phase adjustment value of the internal reference wave for the MSK modulation by the amplitude adjuster 24. The phase adjustment value is then fed to the adder 23.

In the MSK demodulator 10, a deviation from the amplitude center during the phase adjustment is detected for the phase adjustment. The variation in the STW optimum phase value (count) needs to be continually varied up and down with respect to a given center value. The count discontinuity shown in FIG. 18C is not preferable.

In accordance with the embodiment of the present invention, the phase adjusting up/down counter 39 is controlled in a manner free from the count discontinuity. As shown in FIG. 18A, the count reaches the second period value minus 1 (367) at time tC. To further count up, the count-up and count-down operation is performed with the count shifted to the first period value. The count-up and count-down operation thereafter is performed with respect to the first period value.

As shown in FIG. 18B, the count reaches the zero value at time tD. To further count down, the phase adjusting up/down counter 39 performs the count-up and count-down operation with the first period value minus 1 set. The phase adjusting up/down counter 39 thereafter performs the count-up and count-down operation with respect to the first period value.

The first period value minus 1 is set when the count is down from the zero value, and the first period value is set when the count is up from the second period value minus 1. Once set in this way, no discontinuity occurs when the count crosses the first period value. Any discontinuity is thus repeated no longer.

The count varies with respect to the first period value as the center value for convenience of explanation only. The center value is determined as a phase convergence point, and may be varied. When the count becomes zero or below or the second period value or above, the count starts with the first period value, and the count is thereafter prevented from becoming zero or below or the second period value or above. The center value of the varying count falls within a phase variation range centered on the first period value, for example, within a range of count 91 to count 275.

The STW optimum phase value is controlled in a way free from a discontinuity, and there is no problem with the use of the STW optimum phase value in the MSK demodulator 10.

Figure 19:
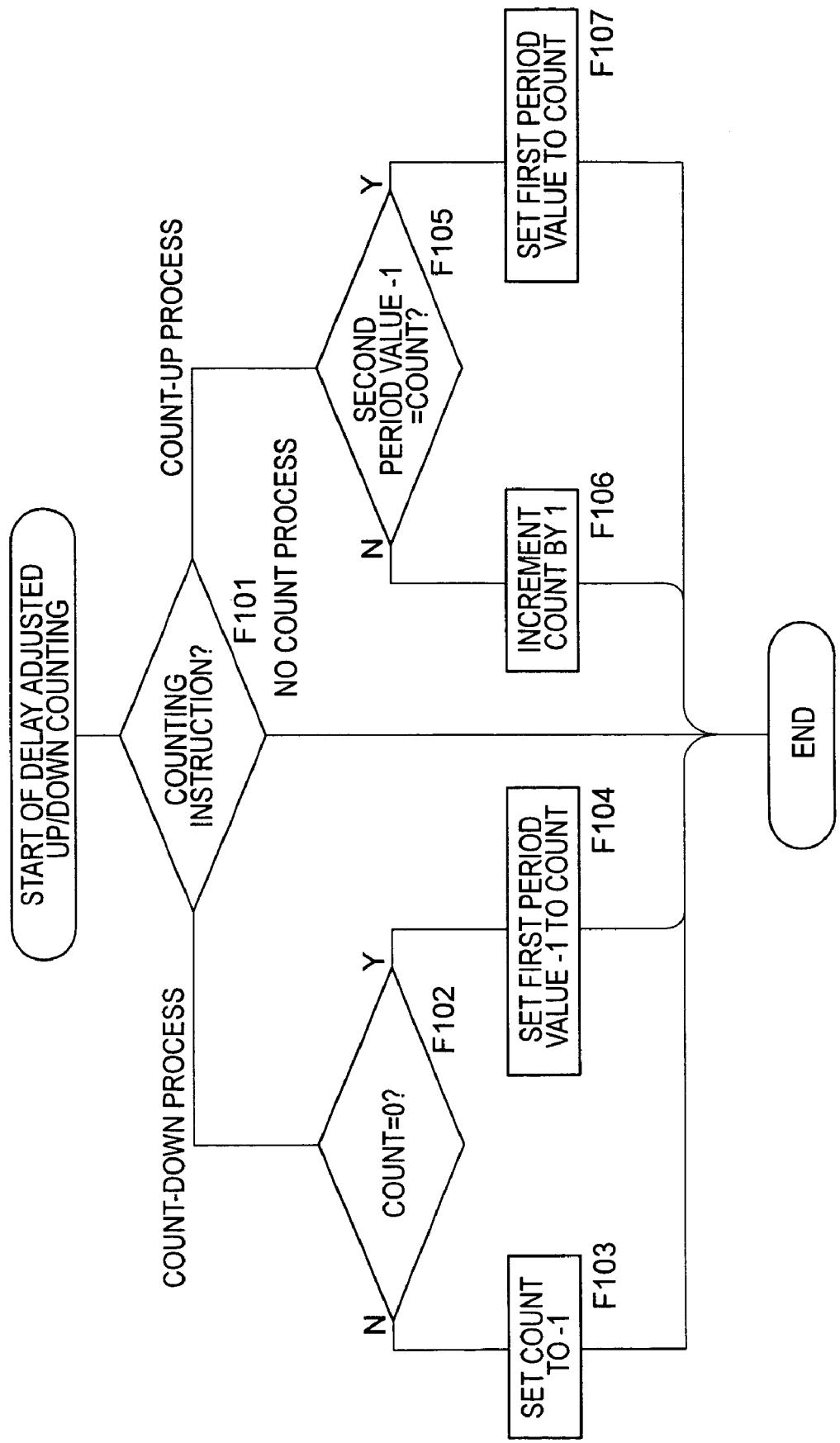
FIG. 19 illustrates an improved MSK demodulated waveform in accordance with one embodiment of the present invention.

The count process of the phase adjusting up/down counter 39 to prevent discontinuity as shown in FIGS. 18A and 18B is discussed with reference to FIG. 19. The process illustrated in FIG. 19 is performed each time a count instruction is issued from the optimum phase determiner 38.

In step F101, the optimum phase determiner 38 determines the instruction of count-up, count-down and hold from the optimum phase determiner 38. If the instruction is for holding the count, processing ends without changing the count.

If the instruction is a count-down, processing proceeds to step F102 to determine whether the current count is "0". If it is determined that the count is not "0", processing proceeds to step F103 to decrement the count by 1.

If it is determined in step F102 that the count is "0", processing proceeds to step F104 to set the first period value minus 1 (183, for example) to the count.

If it is determined in step F101 that the instruction is a count-up, processing proceeds to step F105 to determine whether the current count is the second period value minus 1 (367, for example). If it is determined that the current count is not the second period value minus 1, processing proceeds to step F106 to increment the count by 1.

If it is determined in step F105 that the current count is the second period value minus 1, processing proceeds to step F107 to set the first period count (184, for example) to the count.

In this way, no discontinuity occurs in the count. The MSK demodulator 10 appropriately uses the STW optimum phase value in the phase adjustment.

As shown in FIGS. 18A and 18B, only the first discontinuity occurs. The discontinuity that occurs only once does not affect the phase adjustment in the MSK demodulator 10. The first discontinuity not necessarily occurs, and there is a possibility that the first discontinuity occurs if the initial value of the count is close to 0 or the second period value. Ideally, no discontinuity occurs.

The possibility of the occurrence of the first discontinuity depends on the initial value of the count. If the initial value is loaded, the phase adjusting up/down counter 39 is free from the first discontinuity.

As shown in FIG. 13, the system controller 60 supplies a first value load signal to the phase adjusting-up/down counter 39 via a terminal 38i before starting the phase adjustment. For example, the first period value "184" is loaded to the phase adjusting up/down counter 39 as an initial count.

Figure 18D:
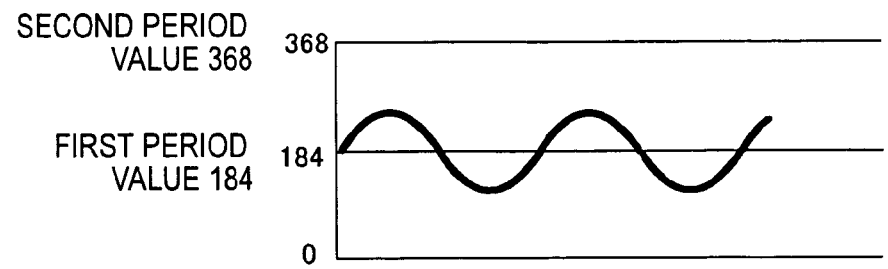

If the process shown in FIG. 19 is performed, the count varies as shown in FIG. 18D. In this way, the phase adjusting up/down counter 39 is free from a count-down instruction to zero or blow, and a count-up instruction to the second period value or above, and no discontinuity occurs. The STW optimum phase value thus becomes optimum for use in the MSK demodulator 10.

The initial load value is not limited to the first period value, and may be any value close to the first period value. A preferable range of the initial load value is determined by a delay control range for the phase adjustment and the setting of the first period value as the count.

Other discontinuity prevention control processes are also contemplated.

Figure 20:
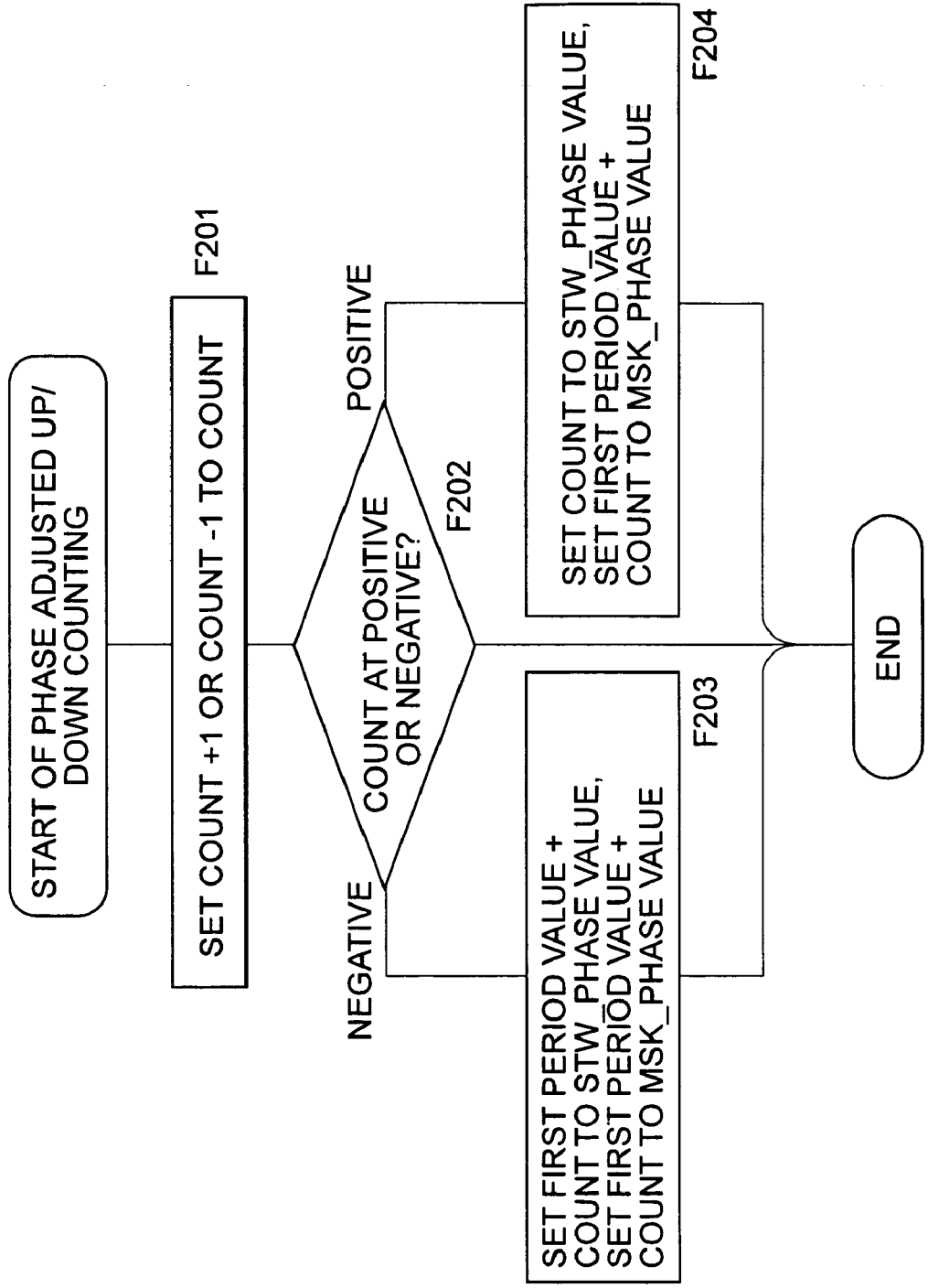
FIG. 20 is a flowchart of the process of another up-down counter in accordance with one embodiment of the present invention.

FIG. 20 illustrates another control process. In this case, the phase adjusting up/down counter 39 can take a negative count, and an STW phase value counter and an MSK phase value counter are arranged. The count of the STW phase counter is fed to the delay circuit 36 and the selector 42. The count of the MSK phase counter is fed to a terminal 15e of the MSK demodulator 10.

In step F201, the phase adjusting up/down counter 39 counts up, counts down, or holds the count in response to an instruction from the optimum phase determiner 38.

In step F202, if it is determined whether the count of the phase adjusting up/down counter 39 is positive or negative.

If it is determined in step F202 that the count is negative, processing proceeds to step F203 to set the count plus the first period value to the count of the STW phase counter. Also, the count plus the first period value is set to the count of the MSK phase counter.

If it is determined in step F202 that the count is positive, processing proceeds to step F204 to substitute the count for the count of the STW phase counter. The count of the MSK phase counter is set to the count plus the first period value.

FIGS. 21A and 21B show the count of the phase adjusting up/down counter 39, the count of the STW phase counter, and the count of the MSK phase counter in the above control process.

As shown in FIG. 21A, the phase adjusting up/down counter 39 counts down from "2" with the first period value at 184.

The count of the STW phase counter changes as follows: 2→1→0→183→182 . . . The count of the MSK phase counter changes as follows: 186→185→184→183→182 . . .

As shown in FIG. 21B, the phase adjusting up/down counter 39 counts up from "180" with the first period value at 184.

The count of the STW phase counter changes as follows: 180→181→182→183→184 . . . The count of the MSK phase counter changes as follows: 364→365→366→367→368 . . .

The STW phase counter always takes a positive value within a range from 0 to the first period value, and is appropriate as a value to be supplied to the delay circuit 36 and the selector 42. The count of the MSK phase counter is free from discontinuity, and results in an appropriate phase adjustment value for the MSK demodulator 10.

A variety of modifications of the above-referenced embodiment are contemplated.

For example, the MSK demodulator 10 and the STW demodulator 30 employ the table group 21 and the table group 41, respectively, to achieve a fine phase adjustment process. Such table groups can be dispensed with as shown FIGS. 22 and 23.

Figure 22:
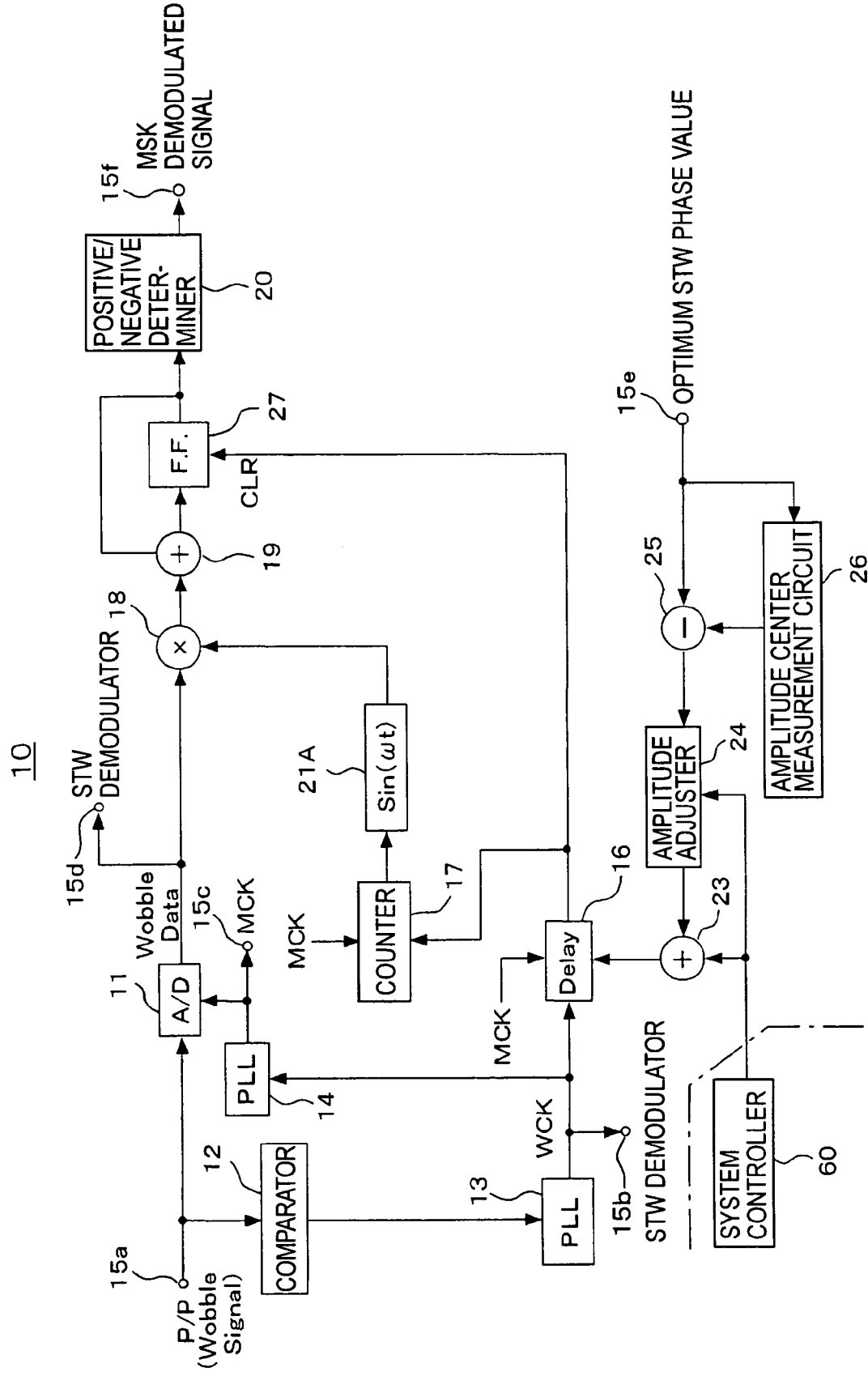
FIG. 22 is a block diagram illustrating another MSK demodulator in accordance with one embodiment of the present invention.
Figure 23:
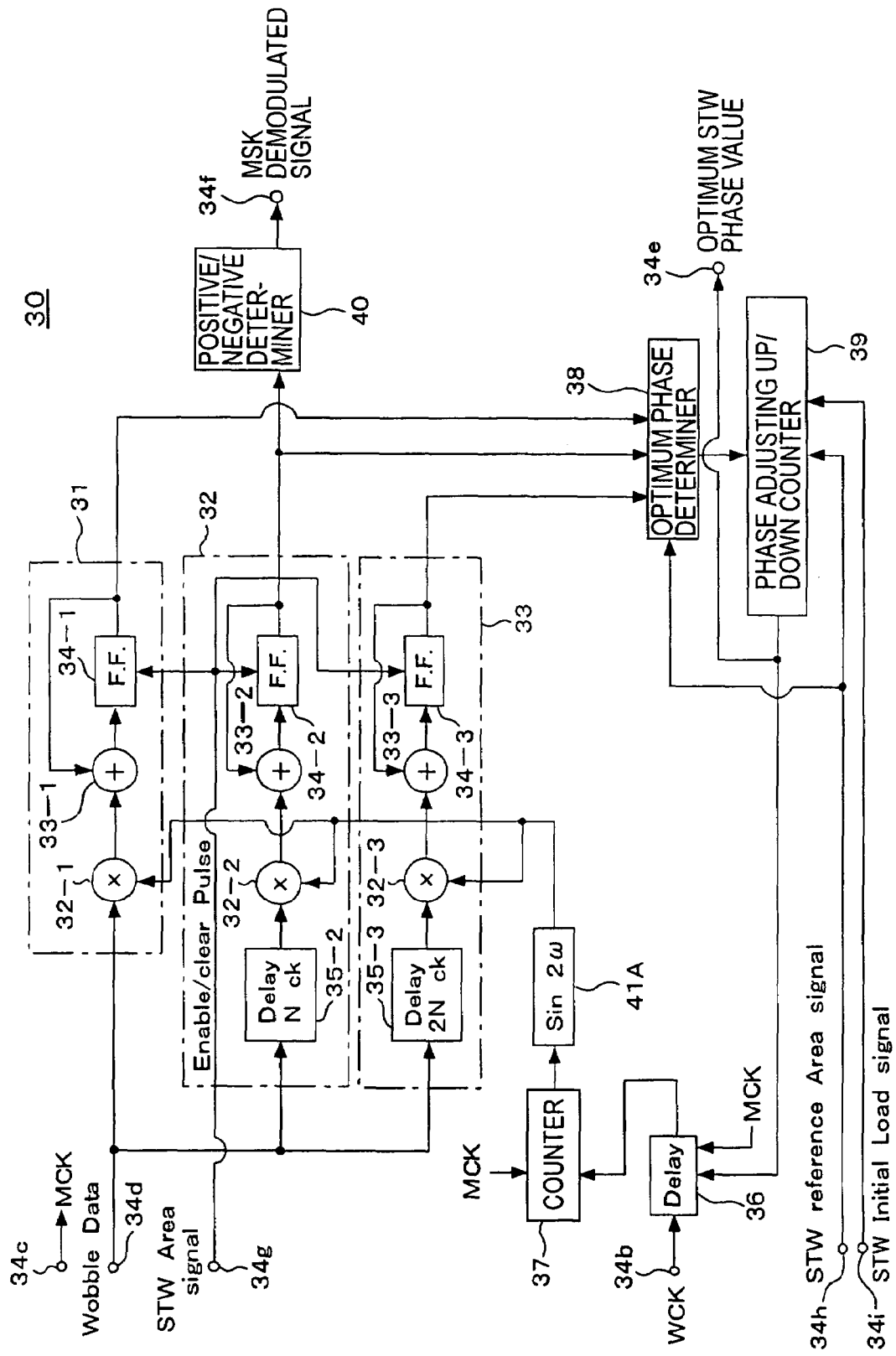
FIG. 23 is a block diagram illustrating another STW demodulator in accordance with one embodiment of the present invention.
Figure 24:
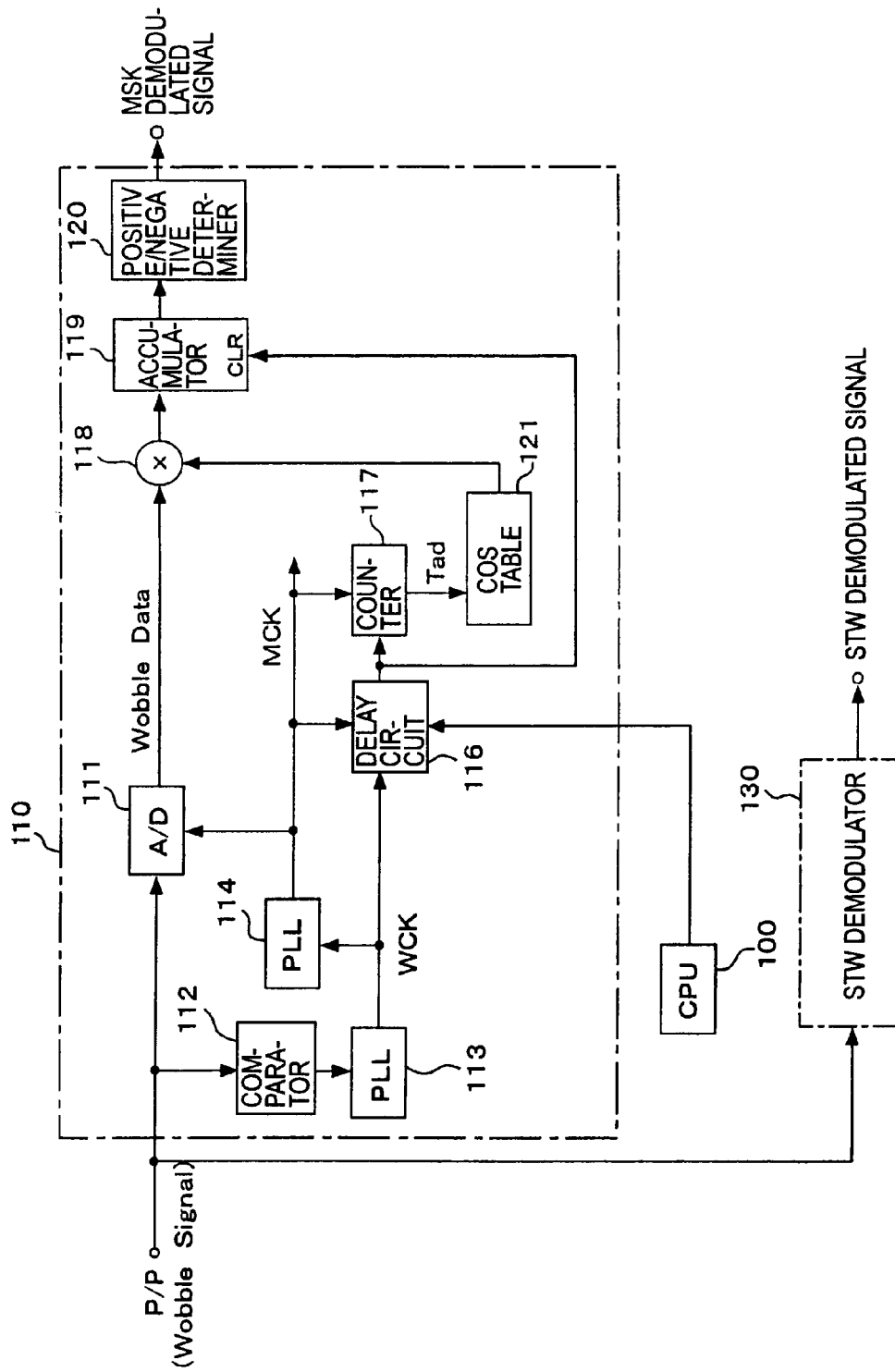
FIG. 24 is a block diagram illustrating a known demodulator.

As shown in FIGS. 22 and 23, elements identical to those described with reference to FIGS. 7 and 13 are designated with the same reference numerals, and the discussion thereof is omitted herein. The MSK demodulator 10 of FIG. 22 includes only a single table 21A generating an internal reference wave, and the STW demodulator 30 of FIG. 23 includes only a single table 41A generating an internal reference wave.

In this case, the phase adjustment of the internal reference wave is performed only by the delay circuit 16 and the delay circuit 36.

The phase adjustment value from the adder 23 is fed to only the delay circuit 16 as shown in FIG. 22. The STW optimum phase value (count) from the phase adjusting up/down counter 39 is fed to only the delay circuit 36 as shown in FIG. 23.

The phase adjustment is performed in steps of unit finer than the unit of the master clock MCK by selecting a table from the table group 21 or the table group 41. If a sufficiently high frequency is provided by using the master clock MCK, the phase adjustment using only the delay circuit 16 and the delay circuit 36 achieve practically high phase adjustment performance.

More specifically, if the operational frequency of the delay circuit 16 and the delay circuit 36 is raised, practically sufficiently high performance level can be achieved.

The demodulator handles information of the wobbling groove on a phase change disk. The present invention is applicable to the wobbling groove demodulation of disks that function in the color change recording method, the magneto-optical recording method, and other recording methods.

Since a resolution higher than the clock frequency is achieved in the phase adjustment method in accordance with the present invention, the present invention is applicable to a variety of apparatuses. The present invention is applicable to not only the wobble address demodulation of the optical disk, but also to a signal transmission and demodulation apparatus that employs the MSK modulation and the STW modulation.

What is claimed is:

1. A demodulator for demodulating an input signal containing a first modulated signal and a second modulated signal, the demodulator comprising:
   a first internal reference wave generator for outputting a first internal reference wave corresponding to the first modulated signal;
   a first demodulation calculator for generating a demodulated signal of the first modulated signal through a calculation process on the first internal reference wave and the input signal;
   a first phase adjuster for adjusting a phase of the first internal reference wave outputted from the first internal reference wave generator;
   a second internal reference wave generator for outputting a second internal reference wave corresponding to the second modulated signal;
   a second demodulation calculator for generating a demodulated signal of the second modulated signal through a calculation process on the second internal reference wave and the input signal; and
   a second phase adjuster for determining an optimum phase of the second internal reference wave based on the demodulation results of the second demodulation calculator and adjusting a phase of the second internal reference wave outputted from the second internal reference wave generator, based on the value of the determined optimum phase,
   wherein the first phase adjuster adjusts the phase of the first internal reference wave outputted from the first internal reference generator, using the optimum phase value of the second phase adjuster.

2. The demodulator according to claim 1, wherein the first modulated signal comprises a minimum shift keying modulated signal, and wherein the first internal reference wave generator outputs the first internal reference wave having the same frequency as a reference wave of the minimum shift keying modulated signal.

3. The demodulator according to claim 1, wherein the second modulated signal comprises a saw-tooth wobble modulated signal, and wherein the second internal reference wave generator outputs, as the second internal reference wave, a second harmonic of a reference wave of the saw-tooth wobble modulated signal.

4. The demodulator according to claim 1, wherein the first phase adjuster adds, to a set phase adjustment value, a phase adjustment value based on the optimum phase value of the second phase adjuster, and adjusts the phase of the first internal reference wave with the sum of the phase adjustment values.

5. The demodulator according to claim 1, wherein the second phase adjuster comprises a counter counting up or down the count thereof in response to the demodulation results from the second demodulation calculator, and acquires, as the optimum phase value, the count of the counter, and
   wherein the counter is controlled so that the optimum phase value is a consecutive value.

6. The demodulator according to claim 5, wherein the counter is loaded with a predetermined initial count at the beginning of phase adjustment.

7. A disk drive device, comprising:
   a reader for reading a wobble signal containing a first modulated signal and a second modulated signal, recorded as a wobbling groove on a disk recording medium;

a first internal reference wave generator for outputting a first internal reference wave corresponding to the first modulated signal in the wobble signal;

a first demodulation calculator for generating a demodulated signal of the first modulated signal through a calculation process on the first internal reference wave and the wobble signal;

a first phase adjuster for adjusting a phase of the first internal reference wave outputted from the first internal reference wave generator;

a second internal reference wave generator for outputting a second internal reference wave corresponding to the second modulated signal in the wobble signal;

a second demodulation calculator for generating a demodulated signal of the second modulated signal through a calculation process on the second internal reference wave and the wobble signal;

a second phase adjuster for determining an optimum phase of the second internal reference wave based on the demodulation results of the second demodulation calculator and adjusting a phase of the second internal reference wave outputted from the second internal reference wave generator, based on the value of the determined optimum phase; and a decoder for decoding signals demodulated by the first and second demodulation calculators to obtain information recorded as the wobbling groove, wherein the first phase adjuster adjusts the phase of the first internal reference wave outputted from the first internal reference generator, using the optimum phase value of the second phase adjuster.

8. The disk drive device according to claim 7, wherein the decoder acquires address information on the disk recording medium, as the information recorded as the wobbling groove.

9. The disk drive device according to claim 7, wherein the first modulated signal comprises a minimum shift keying modulated signal, and wherein the first internal reference wave generator outputs the first internal reference wave having the same frequency as a reference wave of the minimum shift keying modulated signal.

10. The disk drive device according to claim 7, wherein the second modulated signal comprises a saw-tooth wobble modulated signal, and wherein the second internal reference wave generator outputs, as the second internal reference wave, a second harmonic of a reference wave of the sawtooth wobble modulated signal.

11. The disk drive device according to claim 7, wherein the first phase adjuster adds, to a set phase adjustment value, a phase adjustment value based on the optimum phase value of the second phase adjuster, and adjusts the phase of the first internal reference wave with the sum of the phase adjustment values.

12. The disk drive device according to claim 7, wherein the second phase adjuster comprises a counter counting up or down the count thereof in response to the demodulation results from the second demodulation calculator, and acquires, as the optimum phase value, the count of the counter, and wherein the counter is controlled so that the optimum phase value is a consecutive value.

13. The disk drive device according to claim 12, wherein the counter is loaded with a predetermined initial count at the beginning of phase adjustment.

14. A method of adjusting a first internal reference wave and a second internal reference wave in a demodulator including a first internal reference wave generator for outputting the first internal reference wave corresponding to a first modulated signal in an input signal containing the first modulated signal and a second modulated signal, a first demodulation calculator for generating a demodulated signal of the first modulated signal through a calculation process on the first internal reference wave and the input signal, a second internal reference wave generator for outputting the second internal reference wave corresponding to the second modulated signal in the input signal, and a second demodulation calculator for generating a demodulated signal of the second modulated signal through a calculation process on the second internal reference wave and the input signal, the method comprising steps of:

determining an optimum phase of the second internal reference wave based on the demodulation results of the second demodulation calculator;

adjusting a phase of the second internal reference wave outputted from the second internal reference generator based on the value of the determined optimum phase; and adjusting a phase of the first internal reference wave outputted from the first internal reference wave generator, based on the optimum phase value.

* * * * *